United States Patent
Galicia et al.

(10) Patent No.: US 9,367,331 B2
(45) Date of Patent: *Jun. 14, 2016

(54) MULTI-ENVIRONMENT OPERATING SYSTEM

(75) Inventors: Joshua D. Galicia, Cary, IL (US); Jeffrey C. Carlyle, Grayslake, IL (US); Andrew N. Tzakis, Vernon Hills, IL (US); Nicholas C. Hopman, Lake Zurich, IL (US)

(73) Assignee: GOOGLE TECHNOLOGY HOLDINGS LLC, Mountain View, CA (US)

( * ) Notice: Subject to any disclaimer, the term of this patent is extended or adjusted under 35 U.S.C. 154(b) by 734 days.

This patent is subject to a terminal disclaimer.

(21) Appl. No.: 12/839,193

(22) Filed: Jul. 19, 2010

(65) Prior Publication Data
US 2011/0093691 A1    Apr. 21, 2011

Related U.S. Application Data

(60) Provisional application No. 61/226,955, filed on Jul. 20, 2009, provisional application No. 61/226,974, filed on Jul. 20, 2009, provisional application No. 61/226,988, filed on Jul. 20, 2009, provisional application No. 61/291,269, filed on Dec. 30, 2009.

(51) Int. Cl.
*G06F 9/00* (2006.01)
*G06F 15/177* (2006.01)
*G06F 1/00* (2006.01)
*G06F 1/26* (2006.01)
*G06F 1/32* (2006.01)
*G06F 9/44* (2006.01)

(52) U.S. Cl.
CPC .............. *G06F 9/441* (2013.01); *G06F 9/4406* (2013.01)

(58) Field of Classification Search
CPC ................................ G06F 9/441; G06F 9/4406
USPC .................................. 713/1, 2, 100, 300, 320
See application file for complete search history.

(56) References Cited

U.S. PATENT DOCUMENTS

| 5,119,494 A | 6/1992 | Garman |
| 5,446,904 A | 8/1995 | Belt et al. |
| 5,592,657 A | 1/1997 | Johnson et al. |
| 5,757,371 A | 5/1998 | Oran et al. |

(Continued)

FOREIGN PATENT DOCUMENTS

| CN | 101025701 A | 8/2007 |
| CN | 101051282 A | 10/2007 |

(Continued)

OTHER PUBLICATIONS

U.S. Appl. No. 12/839,069, filed Jul. 19, 2010, "System and Method for Switching Between Environments in a Multi-Environment Operating System"; 29 pages.

(Continued)

*Primary Examiner* — Mark Connolly
(74) *Attorney, Agent, or Firm* — McDermott Will & Emery LLP

(57) ABSTRACT

A device with multiple, co-existing, and independent environments interacting with a common kernel, and related methods of operation, are disclosed herein. Operation is altered or dependent on the device being or entering a docked mode.

19 Claims, 13 Drawing Sheets

(56) References Cited

U.S. PATENT DOCUMENTS

| | | |
|---|---|---|
| 5,828,376 A | 10/1998 | Solimene et al. |
| 6,043,816 A | 3/2000 | Williams et al. |
| 6,133,915 A | 10/2000 | Arcuri et al. |
| 6,167,425 A | 12/2000 | Beckhoff |
| 6,170,045 B1 | 1/2001 | Bobak et al. |
| 6,178,503 B1 | 1/2001 | Madden et al. |
| 6,205,452 B1 | 3/2001 | Warmus et al. |
| 6,215,490 B1 | 4/2001 | Kaply |
| 6,336,120 B1* | 1/2002 | Noddings ......... G06F 17/30067 707/829 |
| 6,336,146 B1 | 1/2002 | Burridge et al. |
| 6,338,149 B1 | 1/2002 | Ciccone, Jr. et al. |
| 6,460,136 B1* | 10/2002 | Krohmer et al. ................... 713/2 |
| 6,571,282 B1 | 5/2003 | Bowman-Amuah |
| 6,691,146 B1 | 2/2004 | Armstrong et al. |
| 6,710,788 B1 | 3/2004 | Freach et al. |
| 6,757,002 B1 | 6/2004 | Oross et al. |
| 6,763,458 B1 | 7/2004 | Watanabe et al. |
| 7,114,104 B1 | 9/2006 | Bennett |
| 7,328,333 B2* | 2/2008 | Kawano et al. ................... 713/1 |
| 7,363,128 B2 | 4/2008 | Dietsch et al. |
| 7,424,601 B2 | 9/2008 | Xu |
| 7,424,623 B2 | 9/2008 | Du et al. |
| 7,461,144 B1* | 12/2008 | Beloussov et al. ............ 709/223 |
| 7,468,729 B1 | 12/2008 | Levinson |
| 7,523,738 B2 | 4/2009 | Ruiz |
| 7,529,921 B2* | 5/2009 | Stein et al. ........................ 713/1 |
| 7,533,101 B2 | 5/2009 | Bond et al. |
| 7,536,537 B2 | 5/2009 | Linn |
| 7,590,945 B2 | 9/2009 | Sims et al. |
| 7,595,810 B2 | 9/2009 | Louch |
| 7,634,770 B2 | 12/2009 | Roth |
| 7,636,586 B2 | 12/2009 | Maaniitty |
| 7,681,134 B1 | 3/2010 | Grechishkin et al. |
| 7,689,820 B2* | 3/2010 | Pierce et al. ....................... 713/2 |
| 7,783,665 B1* | 8/2010 | Tormasov et al. ............ 707/783 |
| 7,882,274 B2 | 2/2011 | Peterson |
| 7,975,236 B1 | 7/2011 | Grechishkin et al. |
| 8,046,570 B2 | 10/2011 | King et al. |
| 8,177,554 B2 | 5/2012 | Krasner |
| 8,195,624 B2 | 6/2012 | Yang |
| 8,261,231 B1 | 9/2012 | Hirsch et al. |
| 8,307,177 B2 | 11/2012 | Prahlad et al. |
| 8,352,733 B2 | 1/2013 | Mantere et al. |
| 8,392,498 B2 | 3/2013 | Berg et al. |
| 8,396,807 B1 | 3/2013 | Yemini et al. |
| 8,448,251 B2 | 5/2013 | Harris et al. |
| 8,589,952 B2 | 11/2013 | Wong et al. |
| 8,661,360 B2 | 2/2014 | Jeong et al. |
| 8,868,899 B2 | 10/2014 | Galicia et al. |
| 8,957,905 B2 | 2/2015 | Reeves et al. |
| 8,983,536 B2 | 3/2015 | Gangam et al. |
| 2001/0035882 A1 | 11/2001 | Stoakley et al. |
| 2002/0078260 A1 | 6/2002 | Hart et al. |
| 2002/0140742 A1 | 10/2002 | Lection et al. |
| 2002/0151334 A1 | 10/2002 | Sharma |
| 2002/0157001 A1 | 10/2002 | Huang et al. |
| 2003/0065738 A1 | 4/2003 | Yang et al. |
| 2003/0135771 A1* | 7/2003 | Cupps et al. ................... 713/320 |
| 2003/0204708 A1 | 10/2003 | Hulme et al. |
| 2003/0221087 A1* | 11/2003 | Nagasaka .................... 712/209 |
| 2004/0015966 A1 | 1/2004 | MacChiano et al. |
| 2004/0039950 A1 | 2/2004 | Okamoto et al. |
| 2004/0061723 A1 | 4/2004 | Tai et al. |
| 2004/0066414 A1 | 4/2004 | Czerwinski et al. |
| 2004/0095388 A1* | 5/2004 | Rocchetti et al. ............. 345/763 |
| 2004/0111644 A1 | 6/2004 | Saunders et al. |
| 2004/0148375 A1 | 7/2004 | Levett et al. |
| 2004/0205755 A1 | 10/2004 | Lescouet et al. |
| 2004/0207508 A1 | 10/2004 | Lin et al. |
| 2005/0086650 A1 | 4/2005 | Yates et al. |
| 2005/0108297 A1 | 5/2005 | Rollin et al. |
| 2005/0125739 A1 | 6/2005 | Thompson et al. |
| 2005/0229188 A1 | 10/2005 | Schneider |
| 2005/0240756 A1 | 10/2005 | Mayer |
| 2005/0240763 A9 | 10/2005 | Bhat et al. |
| 2005/0246505 A1 | 11/2005 | McKenney et al. |
| 2005/0268078 A1 | 12/2005 | Zimmer et al. |
| 2006/0005187 A1 | 1/2006 | Neil |
| 2006/0010314 A1 | 1/2006 | Xu |
| 2006/0010446 A1 | 1/2006 | Desai et al. |
| 2006/0026274 A1 | 2/2006 | Cho et al. |
| 2006/0046706 A1 | 3/2006 | Lin et al. |
| 2006/0146057 A1 | 7/2006 | Blythe |
| 2006/0224989 A1 | 10/2006 | Pettiross et al. |
| 2006/0225107 A1 | 10/2006 | Seetharaman et al. |
| 2006/0253706 A1 | 11/2006 | Roberts et al. |
| 2007/0050765 A1* | 3/2007 | Geisinger ......................... 718/1 |
| 2007/0128899 A1 | 6/2007 | Mayer |
| 2007/0135043 A1 | 6/2007 | Hayes et al. |
| 2007/0150842 A1 | 6/2007 | Chaudhri et al. |
| 2007/0162298 A1 | 7/2007 | Melton et al. |
| 2007/0180398 A1 | 8/2007 | McArdle |
| 2007/0192329 A1 | 8/2007 | Croft et al. |
| 2007/0198656 A1 | 8/2007 | Mazzaferri et al. |
| 2007/0226647 A1 | 9/2007 | Louch |
| 2007/0266231 A1 | 11/2007 | Chua |
| 2007/0283147 A1* | 12/2007 | Fried et al. ..................... 713/167 |
| 2007/0288941 A1 | 12/2007 | Dunshea et al. |
| 2007/0294689 A1 | 12/2007 | Garney |
| 2008/0028326 A1 | 1/2008 | Wilson et al. |
| 2008/0034318 A1 | 2/2008 | Louch et al. |
| 2008/0082815 A1 | 4/2008 | Kawano et al. |
| 2008/0100568 A1 | 5/2008 | Koch et al. |
| 2008/0114844 A1 | 5/2008 | Sanchez et al. |
| 2008/0162983 A1 | 7/2008 | Baba et al. |
| 2008/0256468 A1 | 10/2008 | Peters et al. |
| 2008/0270910 A1 | 10/2008 | Lukasik et al. |
| 2008/0276195 A1 | 11/2008 | Moromisato et al. |
| 2008/0282205 A1 | 11/2008 | Dykstra-Erickson et al. |
| 2008/0307350 A1 | 12/2008 | Sabatelli et al. |
| 2008/0307360 A1 | 12/2008 | Chaudhri et al. |
| 2009/0031329 A1* | 1/2009 | Kim ............................... 719/327 |
| 2009/0037909 A1 | 2/2009 | Xu |
| 2009/0063845 A1* | 3/2009 | Lin ............................... 713/100 |
| 2009/0064186 A1 | 3/2009 | Lin |
| 2009/0080562 A1 | 3/2009 | Franson |
| 2009/0089569 A1* | 4/2009 | Baribault et al. ................. 713/2 |
| 2009/0158299 A1 | 6/2009 | Carter |
| 2009/0193074 A1 | 7/2009 | Lee |
| 2009/0199122 A1 | 8/2009 | Deutsch et al. |
| 2009/0199219 A1 | 8/2009 | Rofougaran et al. |
| 2009/0235200 A1 | 9/2009 | Deutsch et al. |
| 2009/0241072 A1 | 9/2009 | Chaudhri et al. |
| 2009/0276771 A1 | 11/2009 | Nickolov et al. |
| 2009/0287571 A1 | 11/2009 | Fujioka |
| 2009/0327917 A1 | 12/2009 | Aaron et al. |
| 2009/0328033 A1 | 12/2009 | Kohavi et al. |
| 2010/0064251 A1 | 3/2010 | Hufnagel et al. |
| 2010/0077347 A1 | 3/2010 | Kirtane et al. |
| 2010/0097386 A1 | 4/2010 | Kim et al. |
| 2010/0107115 A1 | 4/2010 | Sareen et al. |
| 2010/0138515 A1 | 6/2010 | Ruiz-Velasco et al. |
| 2010/0192149 A1 | 7/2010 | Lathrop et al. |
| 2010/0211769 A1* | 8/2010 | Shankar et al. ..................... 713/2 |
| 2010/0217912 A1 | 8/2010 | Rofougaran et al. |
| 2010/0245037 A1 | 9/2010 | Davis et al. |
| 2010/0313156 A1 | 12/2010 | Louch et al. |
| 2010/0313165 A1 | 12/2010 | Louch et al. |
| 2010/0319008 A1 | 12/2010 | Ho |
| 2010/0333088 A1 | 12/2010 | Rogel et al. |
| 2010/0333100 A1 | 12/2010 | Miyazaki et al. |
| 2011/0016299 A1* | 1/2011 | Galicia et al. ..................... 713/1 |
| 2011/0016301 A1* | 1/2011 | Galicia et al. ..................... 713/2 |
| 2011/0022993 A1 | 1/2011 | Ohno et al. |
| 2011/0054879 A1 | 3/2011 | Bogsanyl et al. |
| 2011/0055602 A1 | 3/2011 | Kamay et al. |
| 2011/0066984 A1 | 3/2011 | Li |
| 2011/0093836 A1* | 4/2011 | Galicia et al. ................... 717/139 |
| 2011/0119610 A1 | 5/2011 | Hackborn et al. |
| 2011/0126216 A1* | 5/2011 | Galicia et al. ..................... 713/2 |
| 2011/0138295 A1 | 6/2011 | Momchilov et al. |
| 2011/0138314 A1 | 6/2011 | Mir et al. |
| 2011/0144970 A1 | 6/2011 | Jiang et al. |

(56) References Cited

U.S. PATENT DOCUMENTS

| | | | |
|---|---|---|---|
| 2011/0179387 A1 | 7/2011 | Shaffer et al. | |
| 2011/0246786 A1 | 10/2011 | Laor et al. | |
| 2012/0036450 A1 | 2/2012 | Canton | |
| 2012/0041570 A1 | 2/2012 | Jones et al. | |
| 2012/0042159 A1* | 2/2012 | Liu | 719/318 |
| 2012/0081353 A1 | 4/2012 | Yusupov et al. | |
| 2012/0081380 A1 | 4/2012 | Reeves et al. | |
| 2012/0083264 A1 | 4/2012 | Ramasamy et al. | |
| 2012/0084542 A1* | 4/2012 | Reeves et al. | 713/2 |
| 2012/0084791 A1* | 4/2012 | Gangam et al. | 718/102 |
| 2012/0102495 A1* | 4/2012 | Gangam et al. | 713/1 |
| 2012/0150970 A1 | 6/2012 | Peterson et al. | |
| 2012/0151372 A1 | 6/2012 | Kominac et al. | |
| 2012/0173741 A1 | 7/2012 | Brittain et al. | |
| 2012/0173986 A1 | 7/2012 | Jung | |
| 2012/0174021 A1 | 7/2012 | Dharawat | |
| 2012/0192100 A1 | 7/2012 | Wang et al. | |
| 2012/0227058 A1 | 9/2012 | Hunt et al. | |
| 2012/0278747 A1 | 11/2012 | Abraham et al. | |
| 2012/0278750 A1 | 11/2012 | Abraham et al. | |
| 2012/0304092 A1 | 11/2012 | Jarrett et al. | |
| 2013/0160013 A1 | 6/2013 | Pires et al. | |
| 2013/0212283 A1 | 8/2013 | Wang et al. | |
| 2013/0293573 A1 | 11/2013 | Wolfe et al. | |
| 2013/0298140 A1 | 11/2013 | Wolfe et al. | |
| 2013/0298141 A1 | 11/2013 | Wolfe et al. | |
| 2013/0311682 A1 | 11/2013 | Barat et al. | |

FOREIGN PATENT DOCUMENTS

| | | |
|---|---|---|
| CN | 101149685 A | 3/2008 |
| CN | 101203842 A | 6/2008 |
| CN | 101382833 A | 3/2009 |
| CN | 101615123 A | 12/2009 |
| CN | 101697181 A | 4/2010 |
| EP | 157783 A1 | 10/1985 |
| EP | 1059582 A2 | 12/2000 |
| EP | 1688816 A1 | 8/2006 |
| GB | 2369959 A | 6/2002 |
| JP | H 07-121336 A | 5/1995 |
| JP | 2005-242445 A | 9/2005 |
| JP | 2007-034600 A | 2/2007 |
| JP | 2009-157802 A | 7/2009 |
| RU | 2005136419 A | 5/2007 |
| RU | 2331160 C2 | 8/2008 |
| WO | WO-03/027876 A1 | 4/2003 |
| WO | WO-2005/043862 A1 | 5/2005 |
| WO | 2007035611 A2 | 3/2007 |
| WO | WO-2010/148306 A1 | 12/2010 |
| WO | WO-2011/060382 A1 | 5/2011 |
| WO | WO-2012/012865 A1 | 2/2012 |
| WO | WO-2012/148881 A1 | 11/2012 |
| WO | WO-2012/148885 A1 | 11/2012 |

OTHER PUBLICATIONS

U.S. Appl. No. 12/838,668, filed Jul. 19, 2010, "System and Method for Initiating a Multi-Environment Operating System"; 29 pages.

U.S. Appl. No. 12/838,868, filed Jul. 19, 2010, "Multi-Environment Operating System", 28 pages.

U.S. Appl. No. 12/838,984; filed Jul. 19, 2010, "Multi-Environment Operating System", 43 pages.

Kernel (computing) from Wikipedia; http://en.wikipedia.org/wiki/Kernal_(computer_science); 18 pages, printed Jun. 5, 2009.

Ubuntu from Wikipedia; http://en.wikipedia.org/wiki/ubuntu; 12 pages, printed Jun. 5, 2009.

Ubuntu Mobile; http://en.wikipedia.org/wiki/ubuntu_mobile; 2 pages, printed Jun. 5, 2009.

Patent Cooperation Treaty, "PCT Invitation to Pay Additional Fees and, Where Applicable, Protest Fee" for International Application No. PCT/US2010/042530 Jul. 11, 2011, 7 pages.

The Xen Team: "Users' manual Xen v2.0 for x86", University of Cambridge, UK, Dec. 31, 2004; 56 pages, XP002638667.

Patent Cooperation Treaty, "PCT Invitation to Pay Additional Fees and, Where Applicable, Protest Fee" for International Application No. PCT/US2010/042526 Jun. 24, 2011, 7 pages.

David Turner: "Introducing Android 1.5 NDK, Release 1", Jun. 25, 2009, 4 pages.

Hassan Z.S., "Ubiquitous Computing and Android" Third International Conference Digital Information Management 2008, IEEE, Piscataway, NJ, USA, Nov. 13, 2008, 6 pages.

Baentsch M. et al., "Mote Runner: A Multi-Language Virtual Machine for Small Embedded Devices", 2009 Third International Conference on Sensor Technologies and Applications, IEEE, Piscataway, NJ, USA, Jun. 18, 2009, 10 pages.

Patent Cooperation Treaty, "PCT Notification of Transmittal of the International Search Report and the Written Opinion of the International Searching Authority, or the Declaration", Oct. 26, 2011, 16 pages, PCT/US2010/042530.

United States Patent and Trademark Office, Non-Final Office Action for U.S. Appl. No. 12/839,069 dated Sep. 10, 2012, 12 pages.

United States Patent and Trademark Office, Non-Final Office Action for U.S. Appl. No. 12/838,984 dated Mar. 28, 2013, 16 pages.

United States Patent and Trademark Office, Final Rejection Office Action for U.S. Appl. No. 12/838,868 dated May 8, 2013, 10 pages.

An Overview of Virtulization Techniques, Jun. 4, 2009, www.vitruatopia.com/index.php/AnOverview_of_Virtualization_Techniques, 4 pages.

Android Central Forums: Getting Started with Android—Tips and Tricks, http://forums.androidcentral.com/general-help-how/31622-getting-started-android-tips-tricks.html, Sep. 2010, excerpted 41 pages.

The Sun Babelfish Blog, "why Apple Spaces is Broken," Nov. 2007, blogs.oracle.com/bblfish/entry/why_apple_spaces_is_broken, 24 pages.

Citrix: Go ToAssist Corporate Remote Support Made Easy, www.gotoassist.com, Fact Sheet, 10.8.10/B-27141/PDF, 2010, Citrix Online LLC.

Citrix: Go ToAssist Corporate Remote Support Made Easy, www.gotoassist.com, Product Overview, 4.21.10/B-26651/PDF, 2010, Citrix Online LLC.

Citrix: Go ToAssist Express Remote Support Made Easy, www.gotoassist.com, Fact Sheet, 9.27.10/B-21307/PDF, 2010, Citrix Online LLC.

Dormon: Motorola Atrix Lapdock, http://www.theregister.co.uk/Print/2011/08/19/accessory_of_the_week_motorola_atrix_lapdock, Aug. 2011, 8 pages.

D'SA, "Run Android apps on Windows," Nov. 2011, http://tech2.in.com/how-to/apps/run-android-apps-on-windows/259042.

EGL 1.0 Specification, published Jul. 23, 2003.

Getting Started with VMware Fusion for Mac OS X, VMware, item EN-000189-00, copyright 2007- 2009, VMware, Inc.

Herrman: VMWare For Mobile Devices Lets yuou Run Windows and Android Simultaneously, http://gizmodo.com/5160685/vmware-for-mobile-devices-lets-you-run-windows-and-android-simultaneously/all, Feb. 2009, 2 pages.

Kobie, "Vmware demos mobile virtualisation," Feb. 2009, http://itpro.co.uk/609992/vmware-demos-mobile-virtualisation.

Martin: iTunes 9.0.2 Improves App Sorting, http://reviews.cnet.com/8301-19512_7-10387022-233.html?tag=contentMain;contentBody;1n, Oct. 2009, 5 pages.

Nakajima, et al., "Composition Kernel: A multicore Processor Virtualization Layer for Rich Functional Smart Products," Software Technologies for Embedded and Ubiquitous Systems, Oct. 2010, pp. 227-238.

Parallels: Parallels Workstation, http://www.parallels.com/products/workstation/, downloaded Dec. 28, 2012.

Paul, "Canonical developers aim to make Android apps run on Ubuntu," May 2009, http://arstechnica.com/gadgets/2009/05-canonical-developerss-aim-to-make-android-apps-run-on-ubuntu/.

Payne, et al. "Lares: An Architecture for Secure Active Monitoring Using Virtualization," IEEE Symposium on Security and Privacy, May 2008, pp. 233-247.

Payne, et al. "Secure and Flexible Monitoring of Virtual Machines," Computer Security Applications Conference, Dec. 2007, pp. 385-397.

(56) References Cited

OTHER PUBLICATIONS

Ramananthan: Ubuntu For Android: The Complete Story, http://www.muktware.com/2012/02/ubuntu-for-andriod-the-complete-story/2553, Feb. 2012, 5 pages.
Richardson, et al., "Virtual Network Computing," IEEE Internet Computing, IEEE Service Center, Jan. 1998, vol. 2, No. 1, pp. 33-38.
Tubbs, "Windows Live Mesh 2011 and SkyDrive Synced Storage woven together nicely; still a few loose threads," posted Oct. 29, 2010, http://www.wysiwygmedia.com/reviews/windows-live-mesh-2011-and-skydrive-synced-storage-woven-together-nicely-still-a-few-loose-threads.wm.
"Ubuntu Linux Rocks!!" published Nov. 15, 2009, http://maxtheitpro.com/ubuntu-linux-rocks.
Vmware: VMware Workstation 7 Product FAQs, downloaded Apr. 18, 2011.
VMware Workstation 7, The Gold Standard in Desktop Virtualization, Product Datasheet, 2009, www.vmware.com.
Whitwam: Everything You Need to Know about Ubunto for Android; http://www.tested.com/tech/android/3627-everything-you-need-to-know-about-ubuntu-for-android/, Feb. 2012, 5 pages.
Windows Live Mesh, Windows Live, 2011, Microsoft.
Casadevall, et al., "Android Execution Environment," retrieved from <https://wiki.ubuntu.com/Specs/AndroidExecutionEnvironment>, Apr. 28, 2009, 5 pages.
Codecoffee, "How to compile & execute C programs under Linux (Absolute basics)," Oct. 2009, retrieved from http://www.codecoffee.com/tipsforlinux/articles/18.html.
Maker, "A Survey on Android vs Linux," University of California 2009, pp. 1-10.
Meier "Professional Android 2 Application Development," Aug. 2010, retrieved from http://esys.ir/files/ref_books/android/esys.ir_professional%20android%202%20application%20development.pdf.
Wikipedia "Comparison of X Window System desktop environment," Jan. 2009, retrieved from http://en.wikipedia.org/wiki/Comparison_oCX_Window_System_desktop_environments.
Wikipedia "GNU C Library," Nov. 2009, retrieved from http://en.wikipedia.org/wiki/GNU_C_Library 4 pages.
Wikipedia "POSIX," Apr. 2009, retrieved from http://en.wikipedia.org/wiki/POSIX, 5 pages.
Wikipedia "Taskbar" retrieved from http://en.wikipedia.org/wiki/Taskbar dated Feb. 24, 2010; 7 pages.
Wikipedia "X Window System," Jan. 2009, retrieved from http://en.wikipedia.org/wiki/X_window_system, 11 pages.
Gelchlik, "How to Lock Your Computer with Bluetooth Proximity Lock Utility," Apr. 2010, http://www.makeuseof.com/tag/lock-windows-computer-bluetooth-proximity-lock-utility/.
Mac OS X Hints, "Lock and unlock a Mac using Bluetooth detection," Dec. 2009, http://hints.macworld.com/article.php?story=20091221173111783.
Ubuntu forums, "Howto: Use BlueProximity and your cellphone for security," Feb. 2008, http://ubuntuforums.org/showthread.php?t=702372.
Webtop Application, archived Apr. 29, 2011, 6 pages, retrieved from https://web.archive.org/web/20110429011220/http://www.motorola.com/support/us-en/consumer-support/software/webtop_application.

* cited by examiner

MULTI-ENVIRONMENT OPERATING SYSTEM

CROSS-REFERENCE TO RELATED APPLICATIONS

This application claims the benefit of each of U.S. Provisional Patent Application No. 61/226,955, titled "System and Method for Switching Between Environments in a Multi-Environment Operating System" and filed on Jul. 20, 2009; U.S. Provisional Patent Application No. 61/226,974, titled "System and Method for Initiating a Multi-Environment Operating System" and filed on Jul. 20, 2009; U.S. Provisional Patent Application No. 61/226,988, titled "Multi-Environment Operating System" and filed on July 20, 2009; and U.S. Provisional Patent Application No. 61/291,269, titled "Multi-Environment Operating System" and filed on Dec. 30, 2009.

BACKGROUND OF THE INVENTION

Operating systems are designed and typically optimized based on specific applications and user desired performance. It is often desirable to have applications of one type of operating system available to another operating system.

General-purpose computer operating systems such as Linux™ and Windows™ have an extensive set of features such as file systems, device drivers, applications, libraries, etc. Such operating systems allow concurrent execution of multiple programs, and attempt to optimize the response time (also referred to as latency time), and CPU usage, or load, associated to the servicing of the concurrently executing programs. Unfortunately, however, such operating systems are not generally suitable for embedded real-time applications, such as for mobile computing devices. Under certain circumstances it would be desirable for a mobile computing device to have the performance associated with a mobile-specific embedded operating system and features of a general-purpose operating system.

Linux, for example, is a well known general purpose desktop operating system with many desirable features for modern devices including modern operating systems features, numerous development tools, networking, etc. However, Linux was not designed to be an embedded or real time operating system. Many modern devices, such as, without limitation, set top boxes, mobile phones and car navigation systems require not only the features of a general purpose operating system such as Linux, but also the features of an embedded or real time operating system, including real time performance.

Given that Linux-based operating systems offer some benefits but that other types of operating systems offer other benefits, particularly in the context of certain types of devices such as mobile devices, it would be desirable if somehow multiple operating systems could be implemented on a single device so that the benefits of each different type of operating system could be achieved in relation to that device. Running multiple operating systems on a single device has been accomplished through virtualization techniques, such as (for example) found in VMware™, VirtualBox™, QEMU™, etc. However, when using virtualization a complete computer is emulated and one or more software stacks are operated in the emulated computing device. Emulation is wrought with high overhead costs, and consequently conventional virtualization techniques are often impractical, especially again in the context of certain types of devices such as mobile devices.

In view of the foregoing, there is a need for a new type of operating system implementation by which the benefits of multiple distinct operating systems can be achieved with less overhead costs than would otherwise be the case using conventional virtualization techniques.

BRIEF SUMMARY OF THE INVENTION

In accordance with at least one embodiment of the present invention, a method for booting a device having at least two co-existing independent operating environments includes initiating a start-up boot sequence, initializing a core kernel, identifying that the device is docked, launching services common to a first operating system and a second operating system, selecting a primary operating system based at least in part upon identifying that the device is docked, launching initializing scripts of a personal computing primary operating system, and launching initializing scripts of a secondary mobile operating system.

According to another embodiment of the invention, a method for initializing an operating system, includes initializing a boot sequence, selecting at least two operating system environments for operating a mobile device, the at least two operating system environments are configured to be independent and co-exist while the device is operational, launching a common Linux-based kernel, launching application services common to a first operating system environment and a second operating system environment, selecting the a primary and secondary operating system environment based at least in part upon a mode state of the device, and simultaneously launching initializing scripts for the primary and secondary operating system environments, wherein the second operating system environment is the primary environment, and the second operating system is the primary operating system when the mode state is docked mode.

According to yet another alternative embodiment, a method for operating a device having multiple co-existing operating environments, includes initiating a boot sequence, configured to simultaneously launch two operating system environments, identifying the mode state of the device, selecting a primary operating environment based at least in part upon the mode state, and changing the primary operating environment based at least in part upon a change in the mode state of the device, wherein the mode state changes from a mobile mode to a docked mode when the device is docked in a dock associated with peripheral devices.

In accordance with an alternative embodiment, a memory storage unit coupled to a computer processor, the memory storage unit having computer executable instructions capable of operating at least two operating system environments on a common kernel, wherein a second operating system environment is optimized for desktop communication and wherein the primary operating environment is switched from the first operating system to the second operating system when a user connects the device to a peripheral device.

According to another embodiment of the invention, a mobile telephone comprises a graphical user interface configured to receive and transmit multimedia information, a computing system comprising a processor coupled to a memory storage unit, a multi-environment operating system having a common kernel, the memory storage unit having computer executable instructions capable of managing resources shared between at least two co-existing independent operating system environments, wherein a Linux-based system is a primary operating environment while the telephone is connected to a peripheral device.

According to yet another embodiment of the invention A mobile computing device includes a computer processor coupled to a computer memory having computer executable instructions configured to initiate an operating system, and an operating system configured to simultaneously run a standard Linux distribution operating system environment and an Android operating system environment on a single kernel, wherein a predetermined device state dictates a primary and secondary operating environment, and wherein the Linux distribution is the primary operating environment when the device is operating in a desktop mode.

According to still another embodiment of the invention, a method for operating a device having a kernel, a first environment with first middleware, and a second environment with second middleware, wherein each of the environments interfaces the kernel, including initializing the kernel, identifying a device mode state, launching services common to each of the first environment and the second environment, determining one of the first and second environments as being a primary environment based at least in part upon the mode state, and launching initializing scripts for each of the first and second environments, wherein the first middleware of the first environment is configured to interpret application code at run-time with a byte-code interpreter, and the second middleware of the second environment is configured to execute a pre-run-time-compiled application, wherein the event that is determined to have occurred is a docking of the device in relation to another device, and wherein the switching from the one environment to the other environment involves a switching between a first focus pertaining to the pre-run-time compiled application and a second focus pertaining to another application based upon the interpreted application code.

According to another embodiment, a method of switching from a first operating environment to a second operating environment of a mobile device includes initiating at least two co-existing independent middleware operating environments coupled to a core kernel, the middleware operating environments each having a corresponding application component, receiving a mode state initialization change signal based at least in part upon the device operation, releasing first operating environment control of the device, and initiating second operating environment control of the device, wherein the first operating system operates the device in a mobile mode and the second operating environment operates the device in a docked mode.

DETAILED DESCRIPTION

It is envisioned that it would be advantageous to have an operating system including both a first application-middleware environment and a second application-middleware environment that each communicate directly with a single kernel running directly upon a computing device's hardware. In at least some embodiments, one or both of the first and second application-middleware environments are Linux-based application-middleware environments. Also, in at least some embodiments, one or both of the first and second application-middleware environments are embedded. In one exemplary embodiment, each of the first and second application-middleware environments is an embedded Linux-based application-middleware environment, and both of the application-middleware environments communicate directly with a single Linux kernel running directly upon a computing device's hardware (e.g., the hardware of a mobile device).

Figure 1:
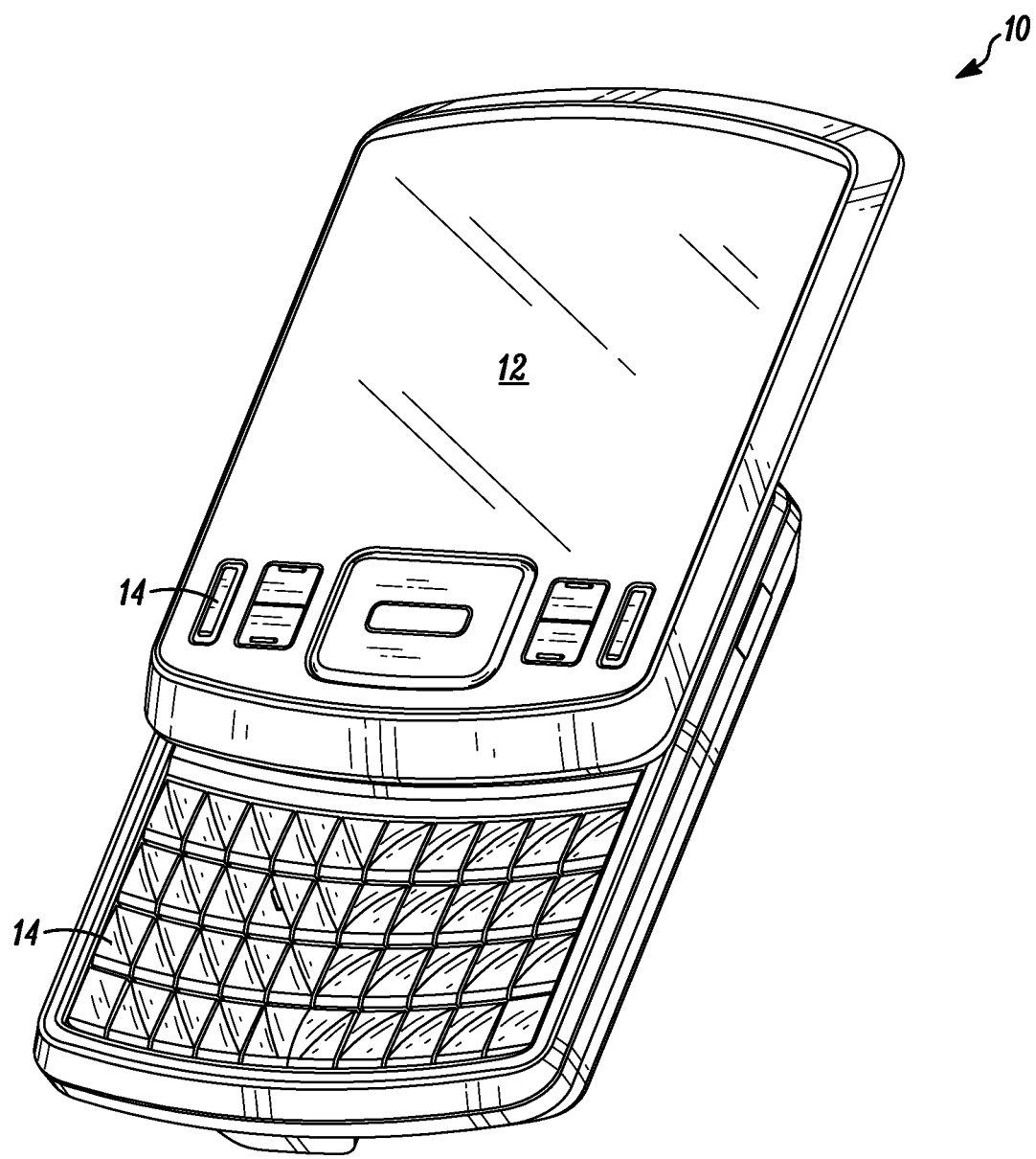
FIG. 1 is an exemplary perspective view of a mobile device.

Referring to FIG. 1, a mobile device 10 is provided. The mobile device 10 includes a graphical user interface (GUI) 12 and a plurality of data input buttons 14. The mobile device 10 is selected from the group including, but not limited to, a mobile personal computer (PC), a netbook, a mobile telephone, a laptop computer, a handheld computer and a smart phone. Although the device 10 is mobile, it is intended to have significant computing power, with a processor speed in excess of 500 MHz, although slower processors are not excluded. Considering the computing power, a user can connect the mobile device 10 to a variety of peripheral devices (not shown). The peripheral devices are selected from a group including, but not limited to, computer monitor, a laptop computer, a desktop computer, a tablet PC, a screen projector, a docking station, a television monitor, etc.

Alternatively, the mobile device can include a variety of added functionality. Additional features can be based upon the particular environments that are selected for the device. By example, a compass function can be provided for orientation, an accelerometer function can be provided, in addition to telephony, Bluetooth and WiFi stack for connectivity keyboard and touch screen function for enhanced interaction.

Figure 2:
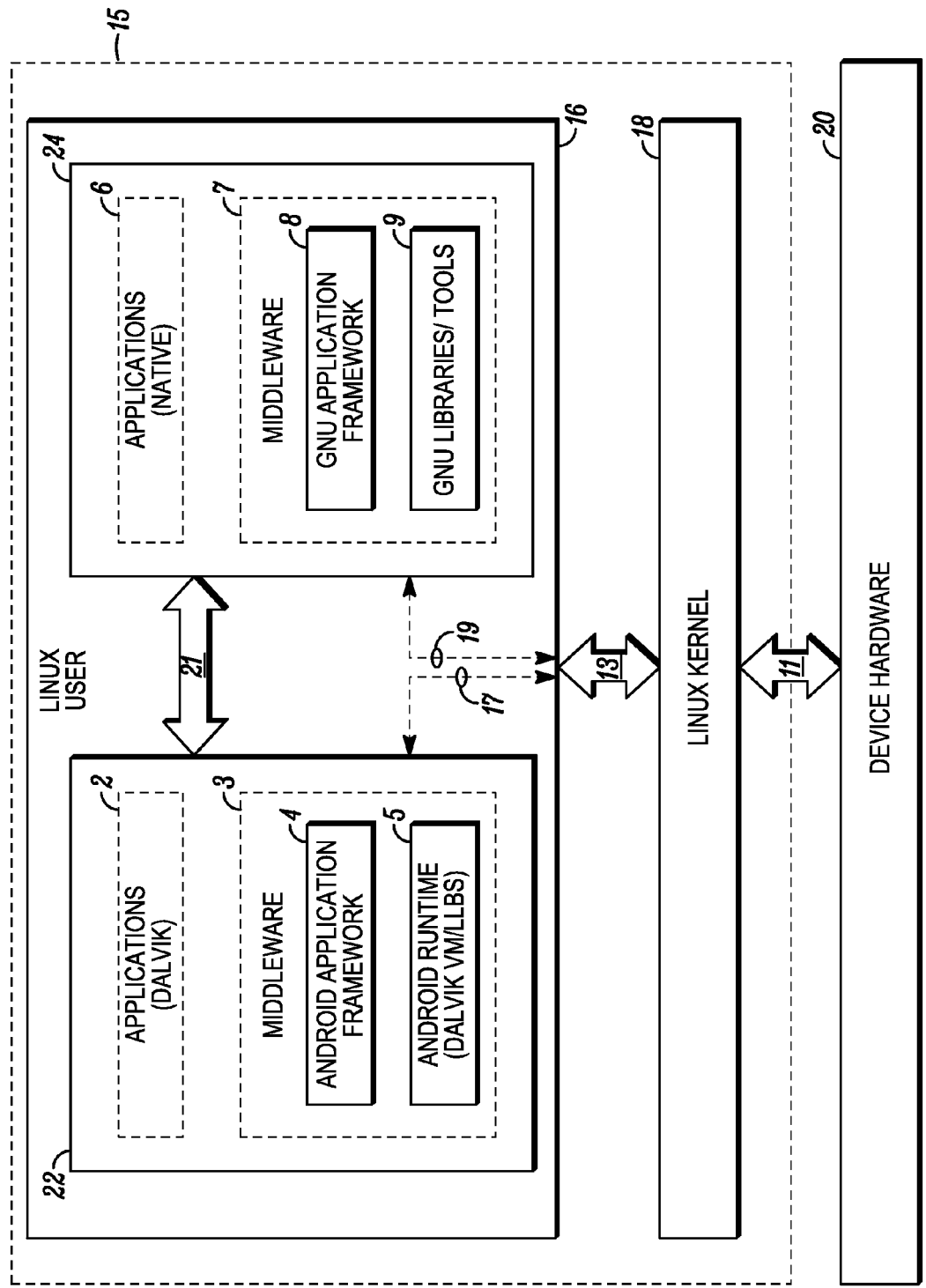
FIG. 2 is a block diagram representing in schematic form exemplary components of the mobile device of FIG. 1, including an exemplary operating system that has multiple environments.

Now referring to FIG. 2, a block diagram is provided showing in schematic form particular components of the mobile device 10 of FIG. 1. As shown, the mobile device 10 of FIG. 1 includes a GNU/Linux distribution or operating system (OS) 15 in communication with device hardware 20 as indicated by an arrow 11. Further as shown, the GNU/Linux OS 15 more particularly includes a Linux kernel 18 and a Linux user component 16 that are in communication with one another as indicated by an arrow 13. The Linux user component 16 is further shown to include a first application-middleware environment 22 and a second application-middleware environment 24 (hereinafter, the respective first and second application-middleware environments will more simply be referred to as the first and second environments, respectively). More particularly, as further indicated by arrows 17 and 19, respectively, each of the first and second environments 22 and 24, respectively, of the Linux user component 16 is in communication with the single Linux kernel 18. In the present embodiment, the first environment 22 is an embedded environment intended for use in mobile devices, namely, an Android™ environment (additional description regarding Android can be found www.openhandsetalliance.com, the website of the Open Handset Alliance, which is hereby incorporated by reference herein), while the second environment 24 is a standard GNU/Linux environment. In addition to the environments 22, 24 being capable of communications with the Linux kernel 18, those environments are also capable of communications with one another, as represented by an arrow 21.

As will be described in further detail below, it is specifically intended that multiple environments 22, 24 can operate and co-exist independently of one another. This is not to say that the two environments 22, 24 are absolutely operationally independent in all respects. Indeed, to the extent that both environments 22, 24 interact with and compete for resources of the Linux kernel 18, the two environments are interdependent in that respect. Likewise, to the extent that the two environments 22, 24 are in communication with one another (e.g., as represented by the arrow 21), the two environments can operate in conjunction with one another in that manner as well. Nevertheless, for purposes of the present explanation, the two environments 22, 24 are considered "independent" in the sense that each of the environments is capable of operating by itself even if the other of the environments was not present (and, indeed, each of the environments can be operationally independent before simultaneous implementation of both of the environments upon the same Linux kernel 18). Additionally, in at least some embodiments, the two environments 22, 24 can also be considered "independent" insofar as each of the two environments is of a different type (e.g.; in terms of being embedded, etc.) and correspondingly serves different purposes in terms of the operations it performs and the functions it can achieve vis-à-vis the Linux kernel 18, the device hardware 20, and the outside world (e.g., users and/or other devices).

Although shown to be a GNU/Linux OS 15 with the Linux kernel 18 and Linux user component 16, the present invention is intended to encompass alternate embodiments in which other types of operating systems, kernels, and other operating system components are employed, and the present invention is not intended to be limited only to Linux-based systems. Likewise, notwithstanding that in the present embodiment the first environment 22 is the Android environment and the second environment 24 is the standard GNU/Linux environment, in other embodiments, other environments can be employed instead of the Android environment. Depending upon the embodiment, such other environments can be but need not be embedded environments, and/or can be but need not be suitable for use in mobile devices. Also, depending upon the embodiment, environments and/or operating systems that operate in real time or do not operate in real time can be employed. Further, while two environments 22, 24 are shown in FIG. 2, the present invention is intended to encompass additional embodiments in which more than two environments are present (and can operate and co-exist independently of one another, where the manner of independence of the environments is as described above).

Still referring FIG. 2, in at least the present embodiment in which the first environment 22 is the Android environment and the second environment 24 is in accordance with the standard GNU/Linux distribution, those environments can more particularly encompass several software components as shown. With respect to the first (Android) environment 22, that environment includes applications 2 (e.g., user applications), which are in the Dalvik language, and middleware 3, with the applications and middleware being bundled together. The middleware 3 as shown includes an Android application framework 4 and Android run-time programming 5. Although not shown, in at least some embodiments, the middleware 3 of the first environment 22 can also include other components, for example, a radio interface layer, and/or components allowing for global positioning system (GPS) functioning. In some embodiments, the middleware 3 (or portions thereof) is released under an Apache license. As for the applications 2, these applications are managed by the Android application framework 4 and interpreted in the Android run-time programming 5 (more particularly, an interpreter established by the run-time programming translates the applications at run-time). The applications 2, which can be understood to include stacks and other application software components, are separate from one another and include computer instructions that are recognizable by the middleware 3 atop which the applications 2 are juxtaposed.

The Android run-time programming 5 in particular makes use of a Dalvik register-based virtual machine (VM) as well as Dalvik libraries and tools. The VM interacts with the Dalvik libraries and tools, as well as with other components such as the Linux kernel 18. The Dalvik (Android implemented) libraries are proprietary libraries that are implemented on top of Linux kernel 18. The functionality implemented by way of the Dalvik libraries is sufficient to run the Dalvik VM, but are based on a subset of the libraries supported by GNU/Linux. The Dalvik register-based virtual machine (including the Dalvik language) is employed in the present embodiment because it has been optimized for implementation in mobile devices. Dalvik was conceived as an instrument to enable a large population of Java programmers to easily develop applications on relatively computationally-weak (compared to personal computers) mobile devices. Java is not the same as Dalvik. In particular, register-based virtual machines such as that provided by Dalvik are easier to optimize than stack-based architectures such as the Java virtual machine on a particular set of hardware. Also, Android/Dalvik replicates a complete middleware layer, rather than merely a byte-code interpreter (VM) as does Java. Nevertheless, while Dalvik is not Java, Dalvik and Java share a common syntax so that programmers can easily adapt their skills to develop Dalvik applications. Thus, although the applications 2 operated by the middleware 3 (and particularly by the Android run-time programming 5) are Dalvik-interpreted applications rather than Java-interpreted applications, the applications 2 are similar to Java-interpreted applications in that they are byte-code-interpreted applications.

As for the second (GNU/Linux) environment 24, that environment includes its own applications 6 (e.g., user applications) coupled to middleware 7, with the middleware including both a GNU application framework 8 and GNU libraries/tools 9. The libraries/tools 9 can include a variety of components including, for example, libraries such as QT (Quicktime) or GTK (GIMP Toolkit) libraries useful for the display of information on a GUI, as well as other libraries/ tools discussed in further detail below. Although not shown, the middleware 7 can include numerous other types of particular software components including, for example, one or more desktop environments such as GNOME, Enlightenment, Xfce, Fluxbox, LXDE and KDE, and/or a Gstreamer multimedia framework, and/or a X11 Window manager. As for the applications 6, these more particularly can be native applications in the sense that the executable code of those applications correspond to the instruction set architecture of the Linux kernel 18 and/or the device hardware 20. As with the applications 2, each of the applications 6 can also be understood to include its own respective stacks and other application software components that are separate from those of the other applications 6, and include computer instructions that are recognizable by the middleware 7 atop which the applications 6 are juxtaposed. In embodiments where the middleware 7 includes one or more of the software components discussed above (e.g., the aforementioned desktop environments), one or more of the applications 6 can be coupled to those components of the middleware.

In the present embodiment, the second environment 24 in combination with the Linux kernel 18 more particularly takes the form of an Ubuntu® Linux stack (additional description regarding Ubuntu can be found at www.ubuntu.com, sponsored by Canonical Ltd. of the United Kingdom, which is hereby incorporated by reference herein). For simplicity of description below, the second environment 24 is hereinafter referred to as an Ubuntu environment (albeit Ubuntu technically also encompasses that Linux kernel as well as the environment 24). In the present embodiment, the second environment 24 (and particularly the middleware 7 of that environment) additionally is capable of supporting a multiplicity of logical memory (data) partitions, while the first environment 22 only has a single logical memory partition in addition to providing system components. Notwithstanding the above description, in alternate embodiments it is possible that the second environment 24 will only have one logical memory partition, and/or that one or more other environments can also or instead be configured to support multiple logical memory partitions.

Notwithstanding the above description in which the first environment 22 is an Android environment and the second middleware system environment 24 is an Ubuntu environment, a variety of other types of environments can also or alternatively be employed including, for example, standard Linux-based environments, Symbian (Symbian Foundation Ltd., www.symbian.com) environments, and Windows-based environments (e.g., Windows and Windows Mobile). In at least some such embodiments, the environments are not Linux-based environments and correspondingly the environments can be implemented in conjunction with different types of kernels other than a Linux-based kernel (this can be the case, for example, with respect to Symbian or Windows-based environments as mentioned above). As already noted above, while the present embodiment particularly envisions the presence of two environments interacting with the same Linux kernel 18, in alternative embodiments it is envisioned that greater than two environments of any of a variety of types can independently co-exist on the same Linux kernel 18 (or other core/kernel).

The device hardware 20 can include a variety of hardware devices. For example, the device hardware 20 can include a memory storage device (not shown) coupled to a processor (not shown), which stores computer executable instructions that are configured to perform various functions and operations, some of which are described herein. Also for example, the device hardware 20 can in addition (or instead) include any of a variety of other components/resources, such as cellular Bluetooth and/or WiFi transceivers or radios, keyboards, other input devices such as a mouse and/or touch screens, memory sub-systems, audio amplifiers, output devices such as speakers and/or video screens, hardware accelerators, IP sockets, etc. The Linux kernel 18 allocates resources of the mobile device by connecting and managing interaction between the physical world of the device hardware 20 and the respective middleware 3, 7 of the environments 22, 24, respectively. The software components encompassed by the respective middleware 3, 7 (again, e.g., the application frameworks 3, 8, run-time programming 5, and/or GNU libraries/tools 9) are often referred to as the middleware because they are logically interposed between the kernel and software applications 2, 6, respectively. The purpose of the respective middleware 3, 7 is to orchestrate interaction between the device hardware 20 (physical world) and the applications 2, 6, respectively.

Figure 3:
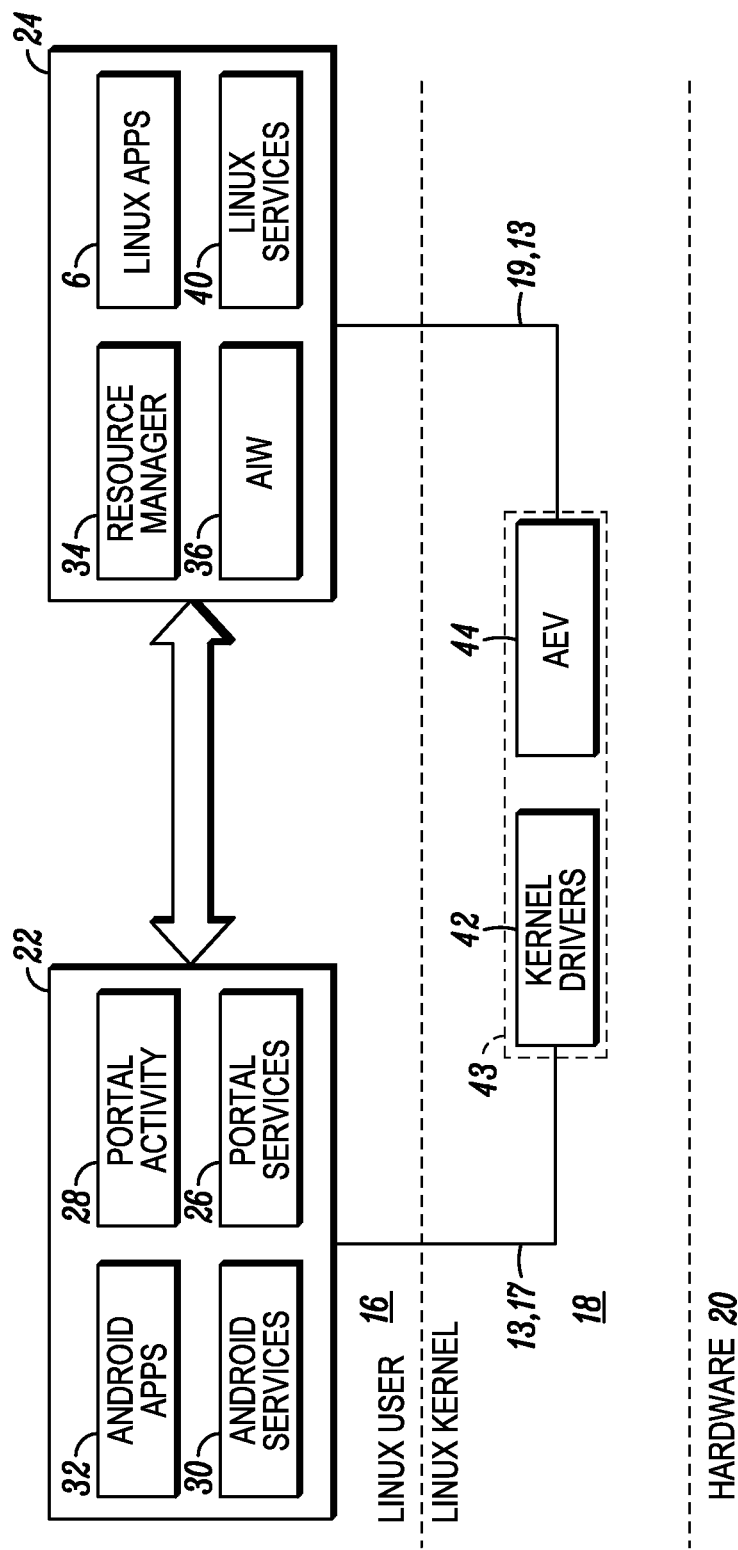
FIGS. 3-5 are block diagrams representing in schematic form certain additional exemplary components (and, in FIG. 4, processes) of the mobile device of FIG. 1 not entirely shown in FIG. 2 including, with respect to FIG. 4, ones pertaining to an exemplary run-time co-existence schema and, with respect to FIG. 5, ones pertaining to an inter-environment communication schema.
Figure 4:
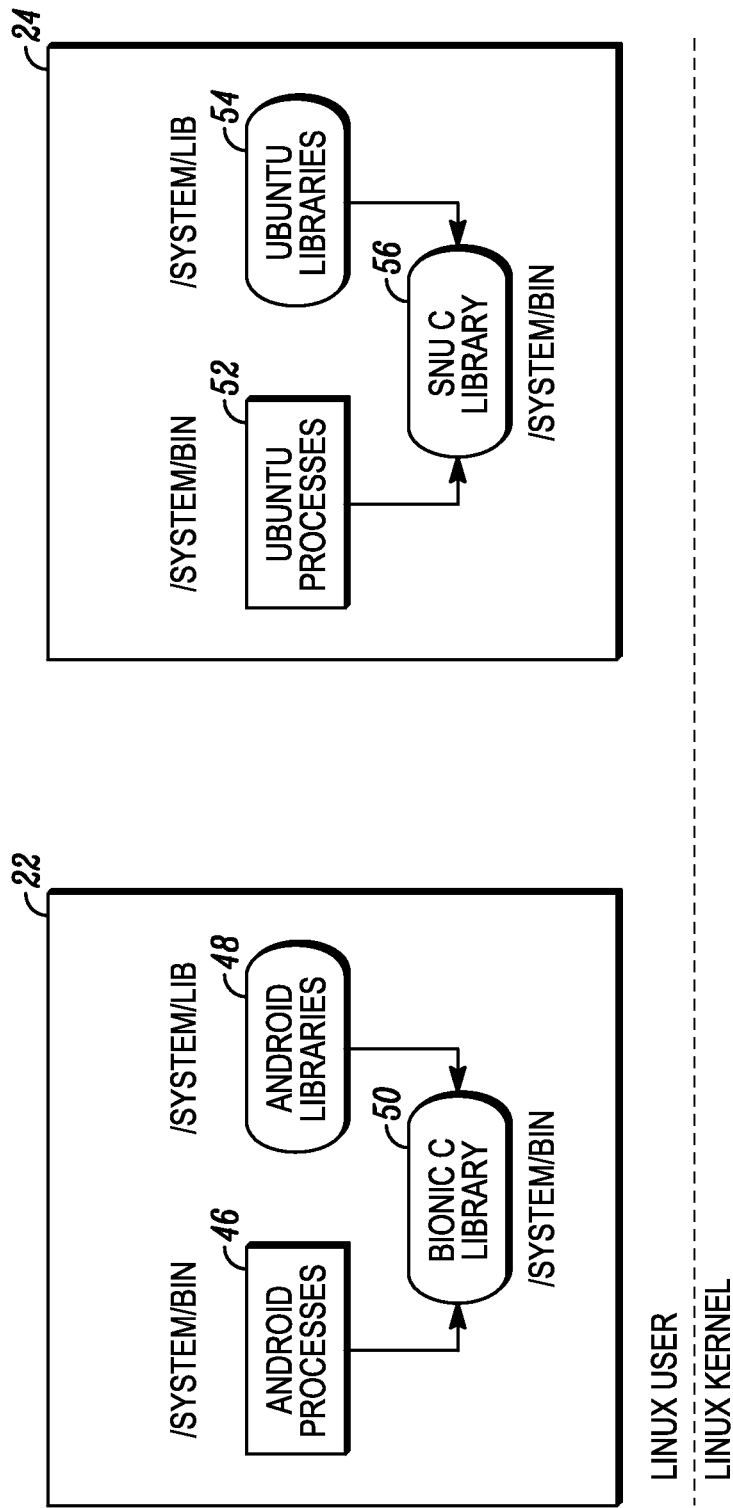
Figure 5:
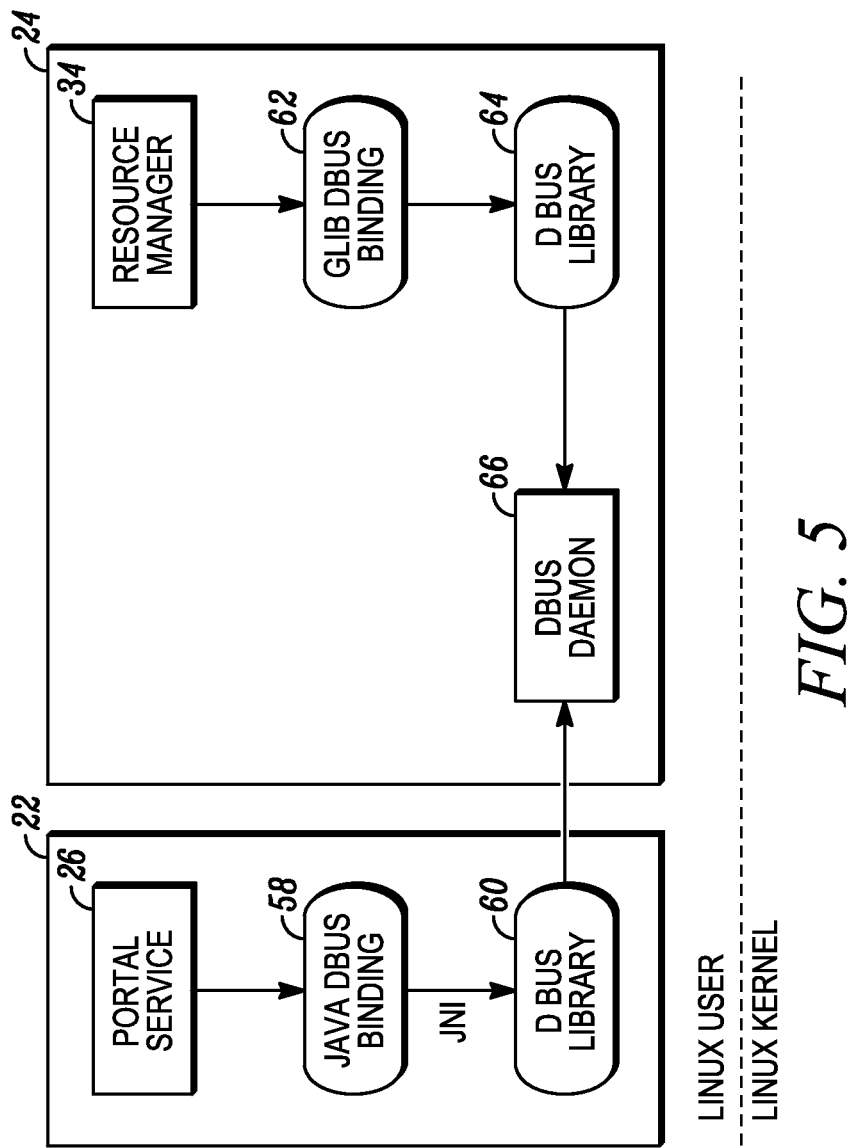

Turning to FIGS. 3-5, aspects of the components of FIG. 2 are shown in greater detail, in schematic form. Referring to FIG. 3, the device hardware 20 is again shown to be in communication with the Linux kernel 18 that is in communication with the Linux user 16, and the Linux user is again shown to include the first (Android-based) environment 22 and the second (Linux-based) environment 24. Further as shown, the kernel 18 particularly includes several modules 43, which include a set of kernel drivers 42 and an AEV module 44 (which is described in more detail below). Included among the drivers 42 are device drivers (e.g., input device drivers) for components of the device hardware 20. Additionally, while not shown in FIG. 2, FIG. 3 more particularly shows the first environment 22 as including a portal service module 26, a portal activity module 28, an Android services module 30, and an Android applications module 32. The modules 28 and 32 can be considered to be among the applications 2 of the first environment 22 as shown in FIG. 2, while the modules 26 and 30 can be considered portions of the middleware 3 of that environment. Also, FIG. 3 more particularly shows the second environment 24 as including an arbiter or resource manager 34, an Android in a window (AIW) module 36, and a Linux services module 40. The modules 34, 36 and 40 can be considered portions of the middleware 7 of FIG. 2. The applications 6 of FIG. 2 are additionally shown in FIG. 3 as Linux applications (potentially the AIW module 36 can also be considered one of the applications 6).

The various modules 26, 28, 30, 34, 36 and 40 are configured to serve particular functions. The AIW module 36 in particular is configured to display a first environment application window on the GUI 12 while the second environment 24 is the primary environment. The AEV 44, which as mentioned above is a kernel module, operates in conjunction with the AIW module 36 and in particular takes absolute coordinate and keyboard events from AIW 36 and passes them to an event hub. With respect to the portal service module 26, that module contains a set of instructions configured to allow service for the first environment 22 and directs all communication with the resource manager 34. While the mobile device 10 is operating, the portal service module 26 is preferably running at all times. Additionally, the portal service module 26 is connected to activity associated with the portal activity module 28, as well as first environment 22 broadcast events. As already mentioned, the portal activity module 28 is an application, or set of computer executable instructions. The portal activity module 28 more particularly represents a second environment 24 application located on the first environment 22 stack. By example, if the second (Linux-based) environment 24 is the Ubuntu environment, the portal activity module 28 can represent a specific Ubuntu application, and when the portal activity module 28 has focus, Ubuntu is in view through the GUI 12.

Generally speaking, numerous applications can run simultaneously, also referred to as a stack of running applications, within any given environment. Logically speaking, the topmost application is deemed to have "focus". Where multiple applications are available for interaction with a user (e.g., where multiple windows corresponding respectively to multiple applications are shown on a display such as the GUI 12), that one of the applications which is currently interacting with the user in terms of being configured to receive input commands or signals from the user at a given time can be considered the application having "focus." Notwithstanding the above description, in at least some embodiments of the present invention, while the second environment 24 is capable of causing the simultaneous display (e.g., on the GUI 12) of multiple windows corresponding to multiple applications, the first environment 22 does not have this capability. Rather, in such embodiments, the first environment is only able to cause the display (e.g., on the GUI 12) of a single window corresponding to a single application at any given time.

As discussed above, the co-existing environments 22, 24 within the operating system 16 communicate with each other as indicated by the arrow 21 and also communicate with the same Linux kernel 18 as indicated by the arrows 13, 17 and 19 of FIG. 2. Because (also as noted above) Android/Dalvik replicates a complete middleware layer, rather than merely a byte-code interpreter (VM) as does Java, absent the taking of appropriate steps there is a possibility of conflict in the operation of the middleware 3 and the middleware 7 of the first and second environments 22 and 24, respectively, in terms of the allocation of resources/physical assets controlled through the Linux kernel 18. To avoid such conflicts, the resource manager 34, which is part of the second environment 24, communicates directly with the portal service module 26, which is part of the first environment 22. Further, the portal service module 26, which is part of the first environment 22, communicates directly with the resource manager 34. The resource manager 34 is a set of instructions configured to manage the resources shared by the first environment 22 and second environment 24. The shared resources include display devices, input devices, power management services and system state information. Furthermore, the resource manager 34 is configured to control the accessing of the device hardware 20 by the environments 22, 24. Additionally, the resource manager 34 identifies and controls which user interface associated with the environments 22, 24 is displayed through the GUI 12.

According to the present embodiment, the portal service module 26 is the source of all communications from the first environment 22 to the resource manager 34. Additionally, the portal service module 26 is a sink for all callbacks from the resource manager 34 to the first environment 22. The resource manager 34 provides a status discoverable application programming interface (API) to the portal service module 26. This API is configured to be called by the resource manager 34 at any time. The resource manager 34 is configured to obtain and process run-time status, which allows for the resource manager to maintain a state machine. For the first environment 22, the portal service module 26 provides run-time status to processes that require them. Similarly, the portal service module 26 requests and receives status updates from processes which provide status information (for these reasons, the portal service module 26 can more particularly be considered part of the Android run-time programming 5 of FIG. 2). A similar communication for the second environment 24 is controlled by the resource manager 34, which provides run-time status to the processes that require them. The resource manager 34 requests and receives status updates from various processes that provide status information. The drivers 42 logically associated with the kernel 18 communicate directly with the resource manager 34 as well as the processes that provide run-time status information. By example, the aforementioned API of the resource manager 34 arbitrates access to user interface devices, such as displays, touch screens or the GUI 12. In yet another example, this API arbitrates access to power input devices, such as batteries and/or AC/DC wall plugs.

As mentioned above, the first environment 22 and the second environment 24 are independent from the other in the manner discussed above, and co-exist with respect to the other. Each of the environments 22, 24 is a fully-functioning environment, and does not need the other environment to function, such that the two environments can be said to exist on the mobile device 10 with 100% independence with respect to the other. The first and second environments 22, 24 do not co-exist in a virtualization or emulation scheme, but rather each of the environments operates on the shared, single kernel 18. The first and second environments 22, 24 in particular have run-time co-existence in which both of the environments 22, 24 are run as stand-alone, native environments. Neither of the environments 22, 24 is recompiled, as there is no need to leverage a common C run-time environment. Because of the presence of the two environments 22, 24, a user can access applications 2, 6 that are coded purely for one or the other of the environments 22, 24, and a user can access an application that is coded for one of the environments without an interruption to the user's computing experience with respect to the other of the environments.

Referring next to FIG. 4, an additional block diagram shows in schematic form aspects of the operating system 15 (with the Linux user 16 and Linux kernel 18) by which an exemplary co-existence scheme for the first (Android) environment 22 and the second (Ubuntu) environment 24 is provided. In general, each of the environments 22, 24 operates on a separate run-time environment, which provides software services for programs and/or processes while the mobile device 10 is operating. More particularly as shown, Android processes 46 and Android libraries 48 access a Bionic C (or simply bionic) library 50, which is optimized and modified specifically for the Android environment. The Android libraries 48 and bionic library 50 can be considered to form part of the Android run-time programming 5 of FIG. 2. Additionally as shown, Ubuntu processes 52 and Ubuntu libraries 54 access a GNU C (glibc) library 56, which is used in many standard desktop Linux-based systems. The Ubuntu libraries 54 and glibc library 56 can be considered to form part of the GNU libraries/tools 9 of FIG. 2. Each respective one of the environments 22, 24 runs on its respective C libraries without conflicting with the other one of the environments 22, 24.

Referring further to FIG. 5, a more detailed communication path between the first environment 22 and the second environment 24 described in FIG. 4 is shown in schematic form. More particularly, an inter-process communication (IPC) system is configured to manage the inter-environment communication flow between the first environment 22 and the second environment 24. As shown, the portal service module 26 (discussed above with respect to FIG. 3) of the first environment 22 communicates with a DBUS binding 58, which in turn is a software package containing programming language and executable instructions configured to communicate with a DBUS library 60, the DBUS binding and DBUS library also being components of the first environment 22. Additionally as shown, the resource manager 34 (also discussed above with respect to FIG. 3) communicates with a Glib DBUS binding 62, which also is a software package containing programming language and executable instructions configured to communicate with a DBUS library 64 configured for the second environment 24. Both the first environment 22 DBUS library 60 and the second environment 24 library 64 communicate through a DBUS Daemon 66, which along with the Glib DBUS library 62 and DBUS library 64 is logically part of the second environment 24, and which acts as the communication link between the two environments. All of the components 26, 58 and 60 of the first environment 22 can be conceptually considered to be part of the middleware 3 of that environment, while all of the components 34, 62, 64 and 66 of the second environment 24 can be conceptually considered to be part of the middleware 7 of that environment.

Figure 6:
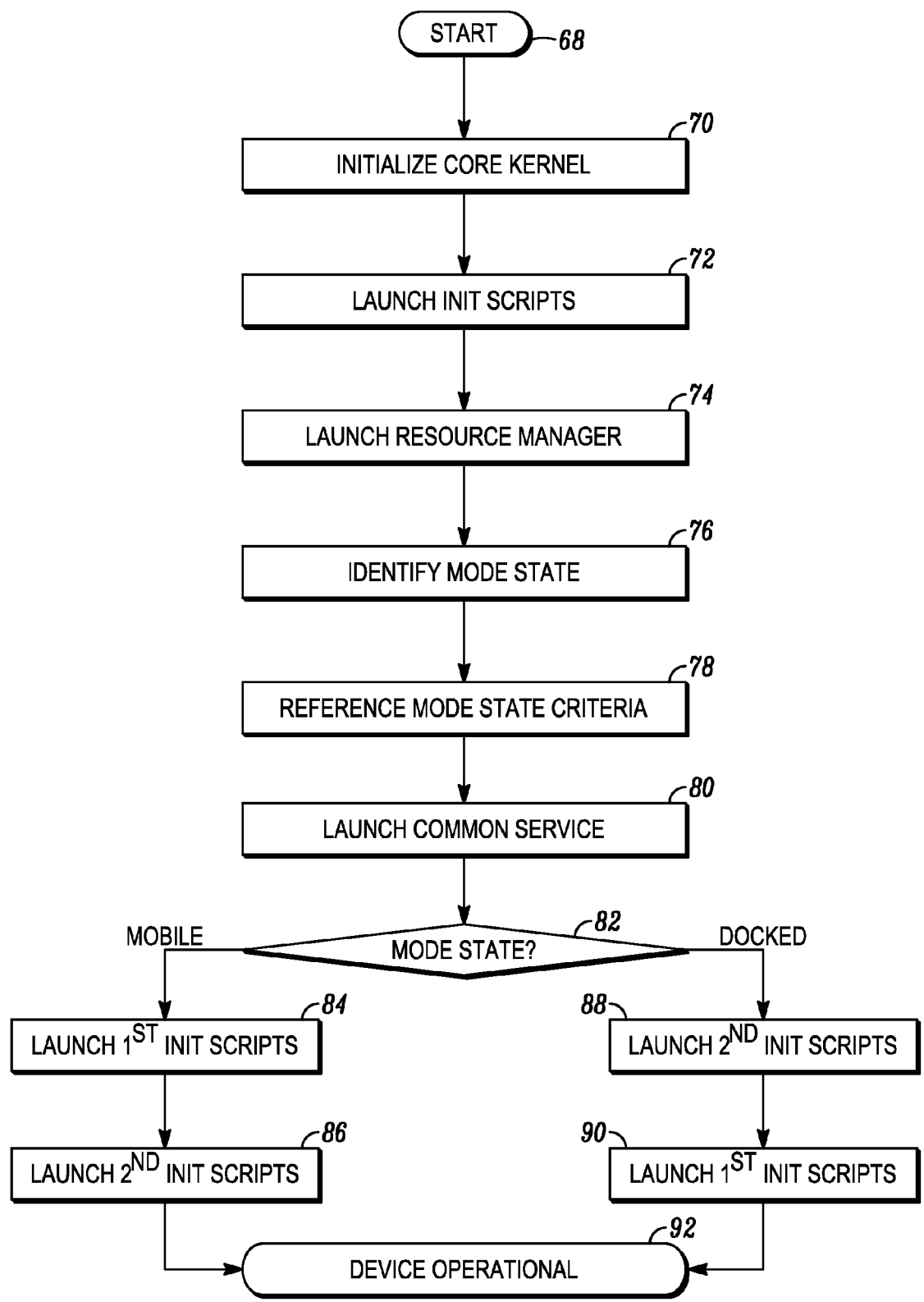
FIG. 6 is a flow chart showing steps of an exemplary booting sequence for the operating system of FIG. 2.

Referring to FIG. 6, a flow chart shows steps of an exemplary boot sequence for the operating system 15 of FIG. 2. The boot sequence includes both common and environment-specific steps. The actual boot sequence is dependent upon rules associated with a predetermined device state of the mobile device 10 that dictates the booting sequence. By example, if the mobile device 10 is connected to a peripheral device, such as a monitor, the device state is considered to be in docked mode, and the second (Linux-based) environment 24 is the default primary environment. Alternatively, if the mobile device 10 is not connected to a peripheral device, then it is in mobile mode, and the first (Android) environment 22 is the default primary environment. Although in any given mode of the mobile device 10 one or the other of the first and second environments 22, 24 serves as a primary environment, both environments are launched simultaneously (that is, the secondary/non-primary environment is launched simultaneously with the primary environment). Further, once both of the environments 22, 24 are launched and one of the environments serves as the primary environment, the secondary environment nevertheless still operates in the background relative to the primary environment, in case the mobile device 10 state changes and the secondary environment is switched to become the primary environment. By example, when the mobile device 10 is in docked mode and the peripheral device is unplugged, there is an automatic switch to mobile mode, which results in the secondary environment becoming the primary environment, and vice versa.

As shown in FIG. 6, the boot sequence is initiated at step 68, followed by the launching/initializing of the Linux kernel 18 (or core) at step 70. In this regard, a bootloader program initializes prior to the launching of the kernel 18. After the Linux kernel 18 is launched/initialized, the kernel itself then launches user space scripts at step 72. The resource manager 34 is further launched at step 74, followed by an identification of the mode state at step 76. Once the mode state is identified, a reference library is accessed at step 78 to determine the criteria associated with and/or dictated by the mode state that is identified. At step 80, services common to both the first environment 22 and the second environment 24 are launched. The mode state determined at step 76 is subsequently referenced and considered at step 82 and, depending upon the mode state, different paths are followed.

In this regard, if at step 82 the mobile mode state is referenced, then the first environment 22 should be the primary environment while the second environment 24 should be the secondary environment. Consequently, in that circumstance, first environment 22 initialization scripts are launched at step 84, followed by the launching of second environment 24 initialization scripts at step 86. Alternatively, if the docked mode state is referenced at step 82, then the second environment 24 should be the primary environment and the first environment 22 should be the secondary environment. Consequently, in that circumstance, second environment 24 initialization scripts are launched at step 88, followed by the launching of first environment 22 initialization scripts at step 90. Following each of the steps 86 and 90, the process in each case proceeds to step 92 at which the mobile device 10 becomes operational. Thus, regardless of which of the environments 22, 24 is the primary environment, both environments are launched and running before the mobile device 10 is operational at step 92. Indeed, since the common services are launched first at step 80, for all intents and purposes the primary and secondary environments are launched in parallel. However, the primary environment-specific services, based upon the device state, are launched immediately before the secondary environment-specific services. By separating the common services launch with the environment-specific launch, the mobile device 10 can be quickly operational with multiple co-existing and independent environments.

Figure 7:
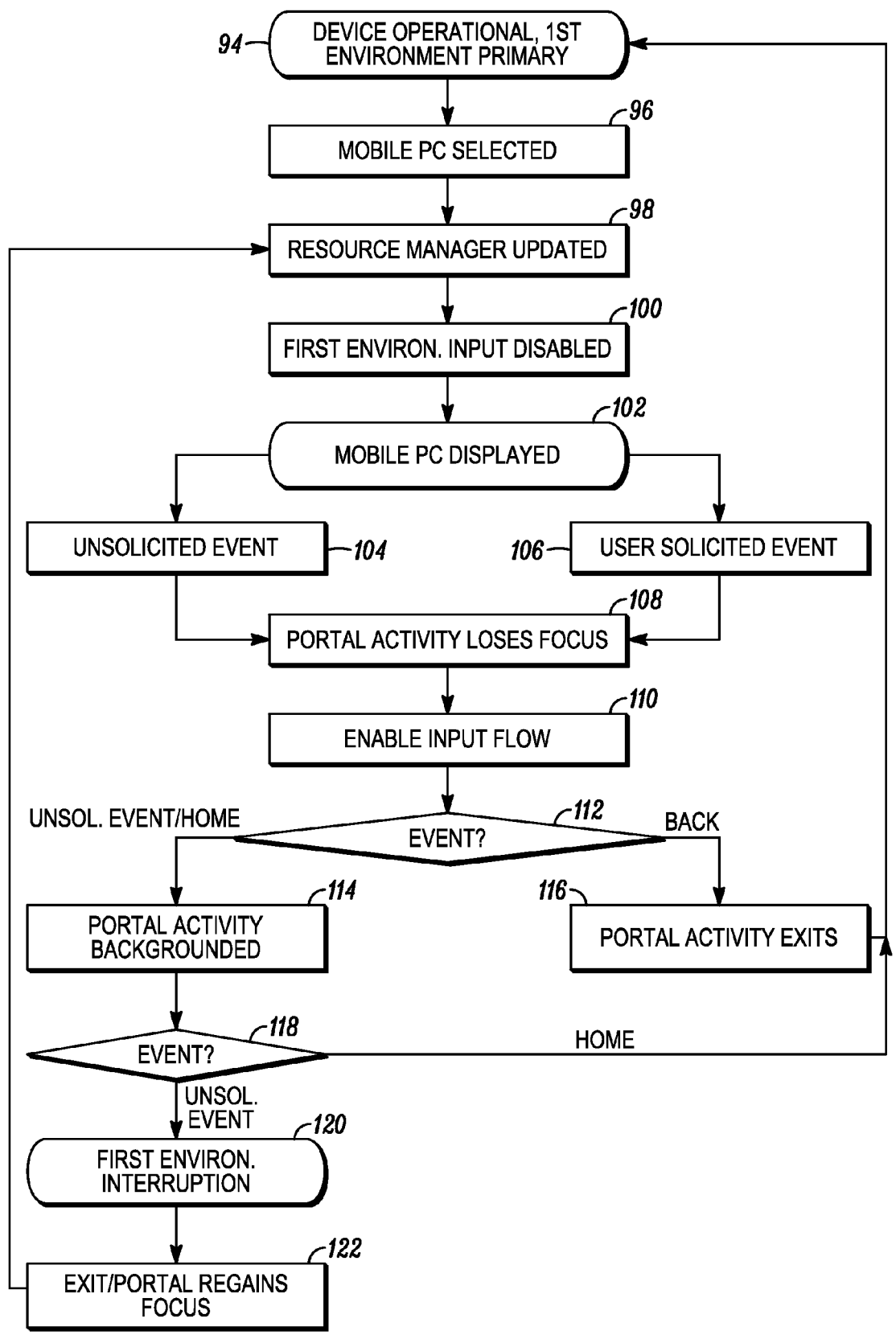
FIG. 7 is a flow chart showing steps of an exemplary process for launching an application in a first environment of the operating system of FIG. 2 while there is simultaneous operation of a second environment of that operating system.

Referring to FIG. 7, a flow chart shows steps of an exemplary process for launching a second environment 24 application (e.g., one of the applications 6) while the mobile device 10 is in the mobile mode and the first environment 22 is the primary environment and thus has primary control over operations of the mobile device 10. As shown, the process begins with the mobile device 10 initially operating with the first environment 22 as the primary environment at step 94. Next, at step 96, a second environment 24 application is selected (e.g., in response to a user command) or otherwise launched in response to response to a signal or event. The second environment 24 application can take a variety of forms depending upon the embodiment; for example, the second environment 24 application in one embodiment is an application referred to as "mobile PC," which is an application in the second environment 22 that when operating provides a full PC view (alternatively referred to as a netbook view) while the mobile device 10 is operating in the mobile mode and the first environment 22 is in primary control. In an alternate embodiment, individual applications from the second environment 24 can be listed in a first environment 22 menu and individually launched, which can be similar to a netbook view.

Still referring to FIG. 7, subsequent to step 96, the portal service module 26 sends a status update communication to the resource manager 34 at step 98 indicating that the portal activity module 28 has gained focus. Thereafter, the resource manager 34 disables the first environment 22 input and switches a virtual terminal at step 100. The mobile PC application is then displayed on the GUI 12 at step 102. While operating the mobile PC application an unsolicited event can occur at step 104 or a user-solicited event can occur at step 106. Unsolicited events include time critical and non-time critical events. By example, a time critical unsolicited event includes a phone call or a scheduled or unscheduled alarm. Further, by example, a non-time critical unsolicited event includes a short message service (SMS) message, an email message or a device update notification. After an event occurs at either of the steps 104 or 106, the portal service module 26 sends a communication to the resource manager 34 indicating that the portal activity module 28 has lost focus, at step 108. Next, at step 110, the resource manager 34 requests the first environment 22 to enable input event flow and switches the virtual terminal. By example, the present embodiment includes separate virtual terminals for switching display control between the first environment 22 and the second environment 24. Broadly speaking, a virtual terminal is a Linux application that allows a system user to switch display controls between Windows-based view and a system console.

Subsequent to step 110, one of several events can occur at step 112 and, depending upon which of such events occurs, the process advances in different manners. More particularly, when an unsolicited event occurs or a user selects the "Home" key at step 112, the portal activity module 28 is switched to the background at step 114 while the unsolicited event continues or the user initiates/operates another application from the "Home" menu of the GUI 12. Alternatively, if the user selects the "Back" key at step 112, then the portal activity module 28 exits the application at step 116 and reverts to the idle main menu (step 94). Once step 114 has been completed then it is determined at step 118 whether another event has occurred. If an event occurs that is an unsolicited event, then the process advances from step 118 to step 120 in which the first environment 22 is interrupted. After the environment interruption at step 120, the interrupting application exits and the portal activity module 28 regains focus at step 122 and the mobile device 10 reverts to step 98. Alternatively, if the event occurring at the step 118 is a solicited event such as user selection of the "Home" key, then the device reverts to the idle main menu (step 94). With respect to the above steps, it should be noted that user-initiated events, such as the selecting of the Home key or Back key, or the initiating of a new application, are exemplary solicited events, which are to be contrasted with unsolicited events.

In an alternative embodiment, the virtual terminal facility is not utilized. Rendering a second environment 24 application while in the mobile mode can be accomplished through a VNC-like application. The second environment 24 application, such as Ubuntu, can be rendered remotely into the VNC client. Additionally, this embodiment does not take physical display control away from the first environment 22. Additionally, in yet another alternative embodiment, non time-critical notifications generated by the first environment 22 are identified and listed in a panel within the second environment 24 view. By listing the notifications in a panel the first environment 22 status information is integrated with the second environment 24 view when the second environment 24 is the primary environment. At the user's leisure, the panel is accessed to reveal non time-critical status notifications. When the panel is engaged the first environment 22 becomes the primary environment and allows the notifications to be viewed. By example, the panel can be a pull-down list that comes down from a status area with a slide gesture.

Figure 8:
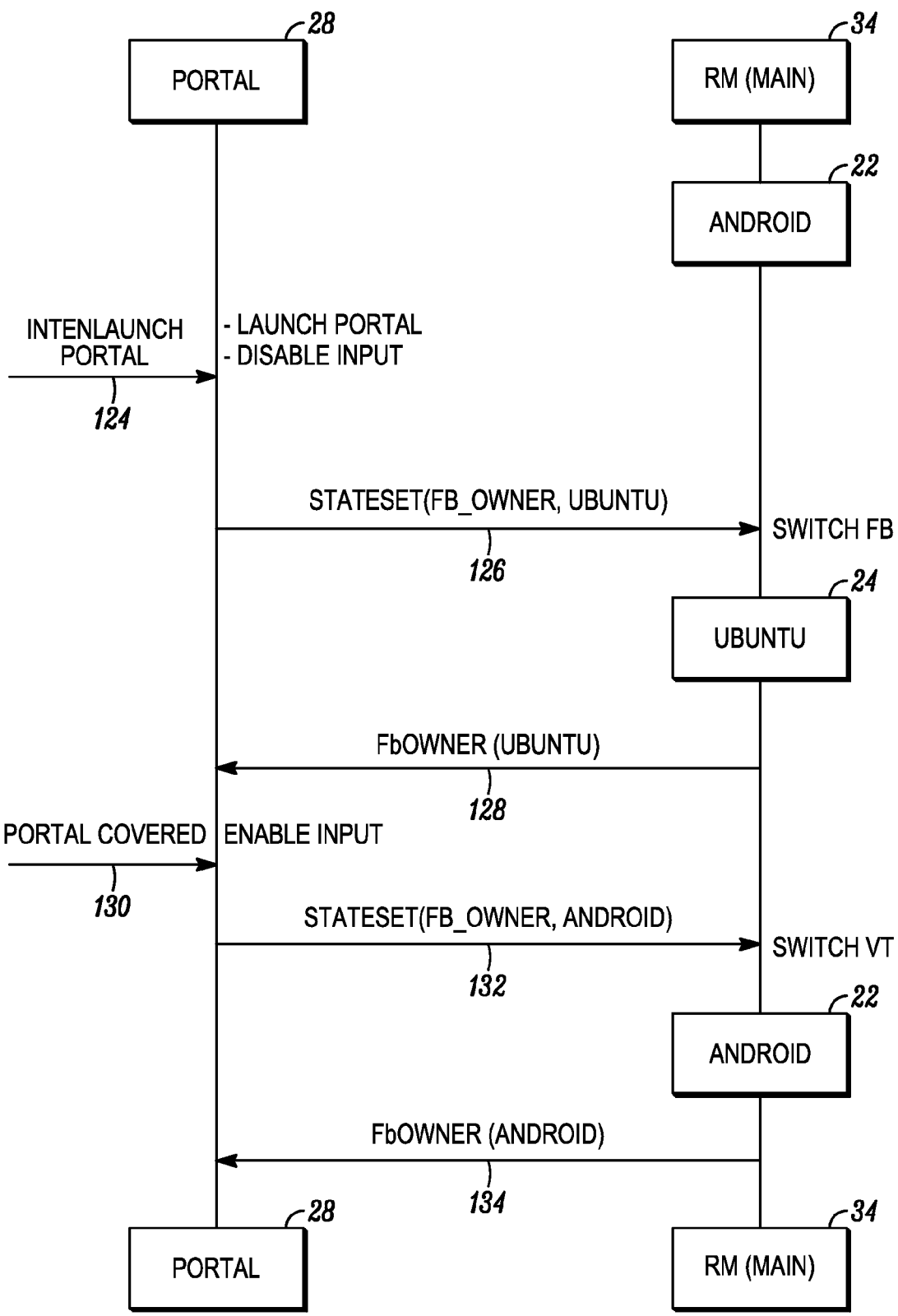
FIG. 8 is a message sequence chart showing exemplary steps for launching an application in the second environment of the operating system of FIG. 2 while a first environment of that operating system has primary control.

Referring next to FIG. 8, a message sequence chart shows steps of an exemplary process for launching a second environment 24 application while the first environment 22 has primary control. The sequence chart provides a step wise flow, from top to bottom, of the signals transmitted between the portal activity module 28 and the resource manager 34. As shown, the portal activity module 28 receives a signal 124 to launch the portal and disable the input. The first environment 22 has primary control before signal 126 changes the mode state such that the second environment 24 obtains primary control. A signal 126 is sent from the portal activity 28 to the resource manager 34, which then generates a responsive signal 128 sent to the portal activity module 28 indicating that the second environment 24 is the primary environment. Further as shown, a signal 130 is received by the portal activity module 28 and enables the input. A signal 132 is sent from the portal activity 28 to the resource manager 34 changing the mode state such that primary environment is switched from the second environment 24 to the first environment 22. After receiving the signal 132, the resource manager 34 switches the virtual terminal. The resource manager 34 then sends a status update signal 134 to the portal activity module 28 indicating that the first environment 22 is primary.

Figure 9:
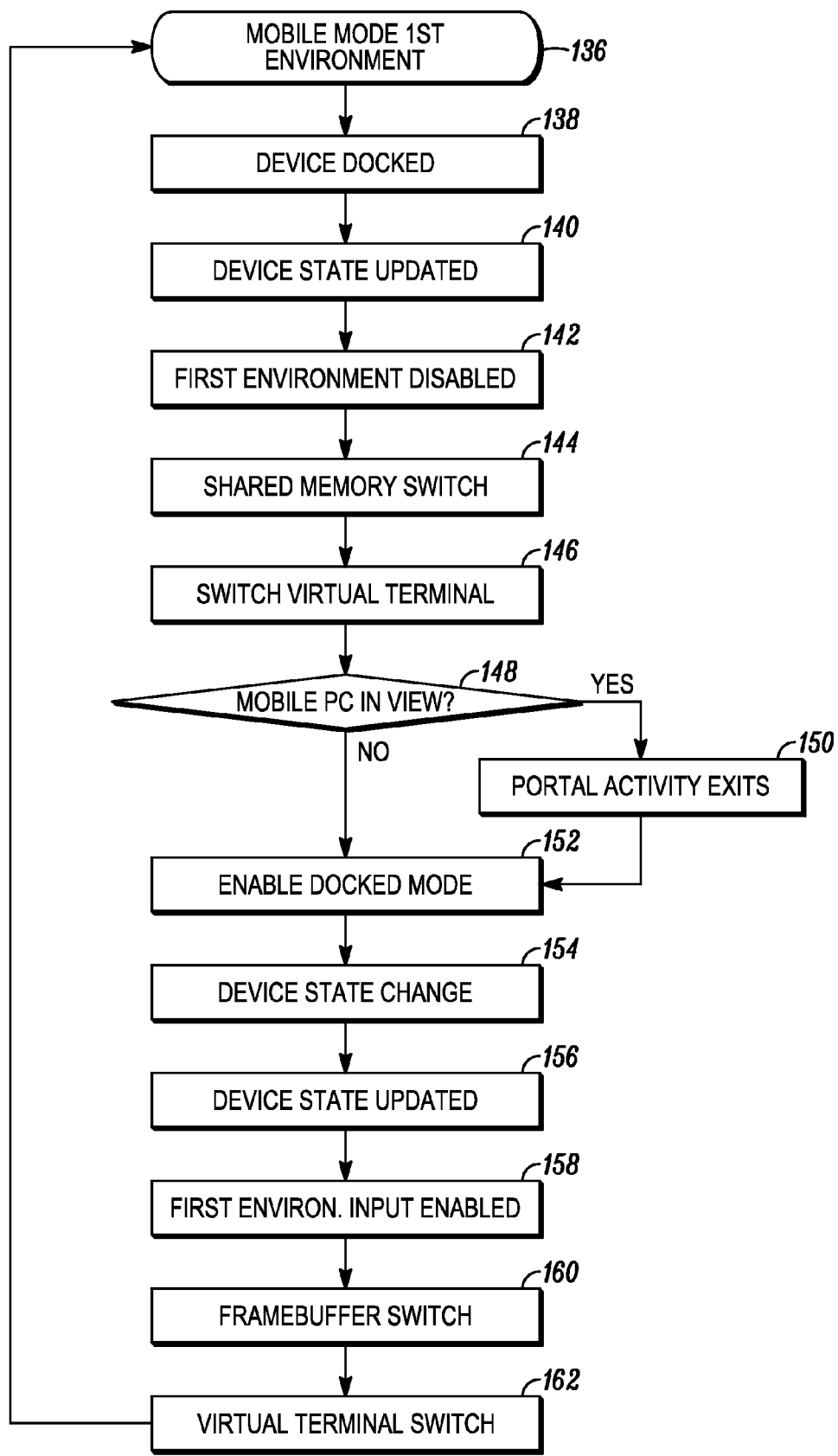
FIG. 9 is a flow chart showing steps of an exemplary process for switching from a first environment of the operating system of FIG. 2 to a second environment of that operating system.

Turning to FIG. 9, a flow chart shows steps of an exemplary process for switching from the first environment 22 to the second environment 24. The process begins at step 136 with the mobile device 10 idle in the mobile mode, with the primary environment being the first environment 22. At step 138 the mobile device 10 is connected to a docking station, or connected to a peripheral device. By example, an HDMI connection can be established between the mobile device 10 and a monitor or a television. The resource manager 34 is notified of the updated connection status at step 140 and the first environment 22 is disabled at step 142 in response to the connection status change. The first environment 22 portal (that is, the portal activity module 28) switches the shared memory framebuffer at step 144, followed by the resource manager 34 switching the virtual terminal at step 146. If the mobile PC application is in view at step 148, then the portal activity module 28 exits at step 150 and the process advances to step 152. Alternatively, if the mobile PC application is not in view, then the process immediately advances from the step 148 to the step 152. At the step 152, the docked mode is entered and the second environment 24 is correspondingly enabled.

Next, subsequent to the completion of step 152 and enabling of the docked mode, it is possible that the state of the mobile device 10 will change at step 154. By example, the state of the mobile device 10 changes when a user removes an HDMI cable, or similar connector, which is used for connecting the mobile device to a peripheral device. In the event that the device state changes at step 154, then the resource manager 34 receives a status state update at step 156. Following the receipt of the state update at step 156, the first environment 22 is enabled at step 158 and the device operates again in the mobile mode. Next, a framebuffer switch is requested at step 160 and a virtual terminal switch is requested at step 162, both of which are performed by the portal activity 26. Following step 162, the mobile device 10 reverts to an idle state in the mobile mode by returning to step 136.

Figure 10:
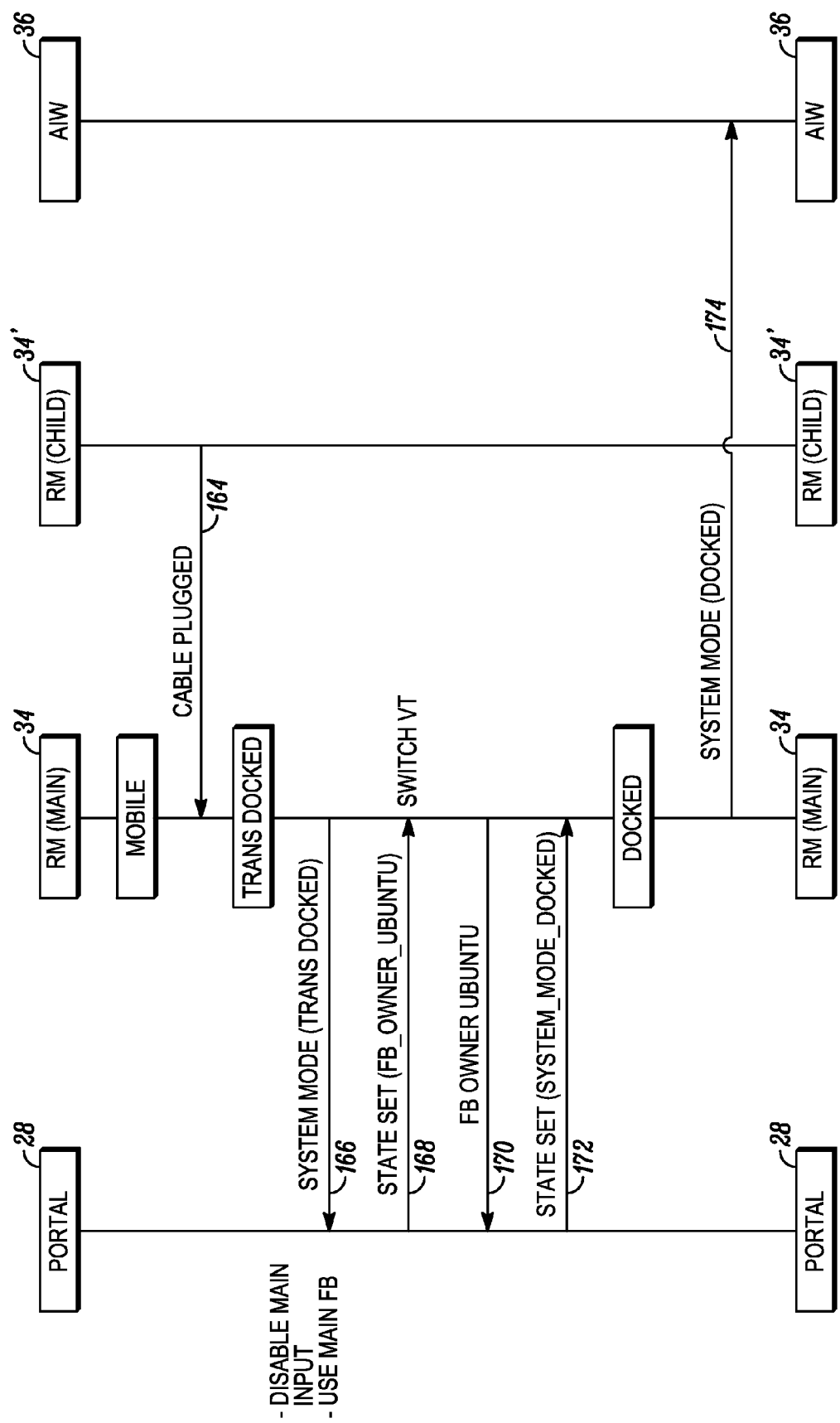
FIGS. 10-11 are message sequence charts showing steps of exemplary processes for switching from a first environment of the operating system of FIG. 2 to a second environment of that operating system.

Referring to FIG. 10, a message sequence chart shows steps performed during an exemplary process in which the mobile device 10 transitions from the mobile mode (where the primary environment is the first environment 22) to the docked mode (where the primary environment is the second environment 24). As shown, initially the mobile device 10 is operating in the mobile mode and the first environment 22 is the primary environment. A cable signal 164 is received by the resource manager 34, which indicates that an HDMI or alternate hardwire plug has been attached to the mobile device 10 (also as shown, the cable signal 164 can be considered as being received from a child resource manager 34', as opposed to the main resource manager 34). The cable signal 164 is an exemplary mode state initialization change signal. In an alternative embodiment, the plug can be representative of wireless communication between the mobile device 10 and a peripheral device, and disabling of such wireless communication would cause a mode state initialization change signal to be generated. Subsequent to the signal 164, a sequence of further signals transitioning the device from the mobile mode to the docked mode is initiated. In this regard, a signal 166 is sent from the resource manager 34 to the portal activity module 28 indicating a mode status transition and disabling the main data input. The portal activity module 28 then sends a signal 168 to the resource manager 34 identifying the second environment 24 as now being primary and switching the virtual terminal. Further, a signal 170 is also sent from the resource manager 34 to the portal activity module 28 identifying the second environment 24 as the primary environment that has taken ownership of the framebuffer. Additionally, a mode state change confirmation signal 172 is sent from the portal activity module 28 to the resource manager 34 identifying that the mobile device 10 is now in the docked mode and that the second environment 24 is the primary environment. A system mode update signal is then also sent from the resource manager 34 to the AIW 36.

Figure 11:
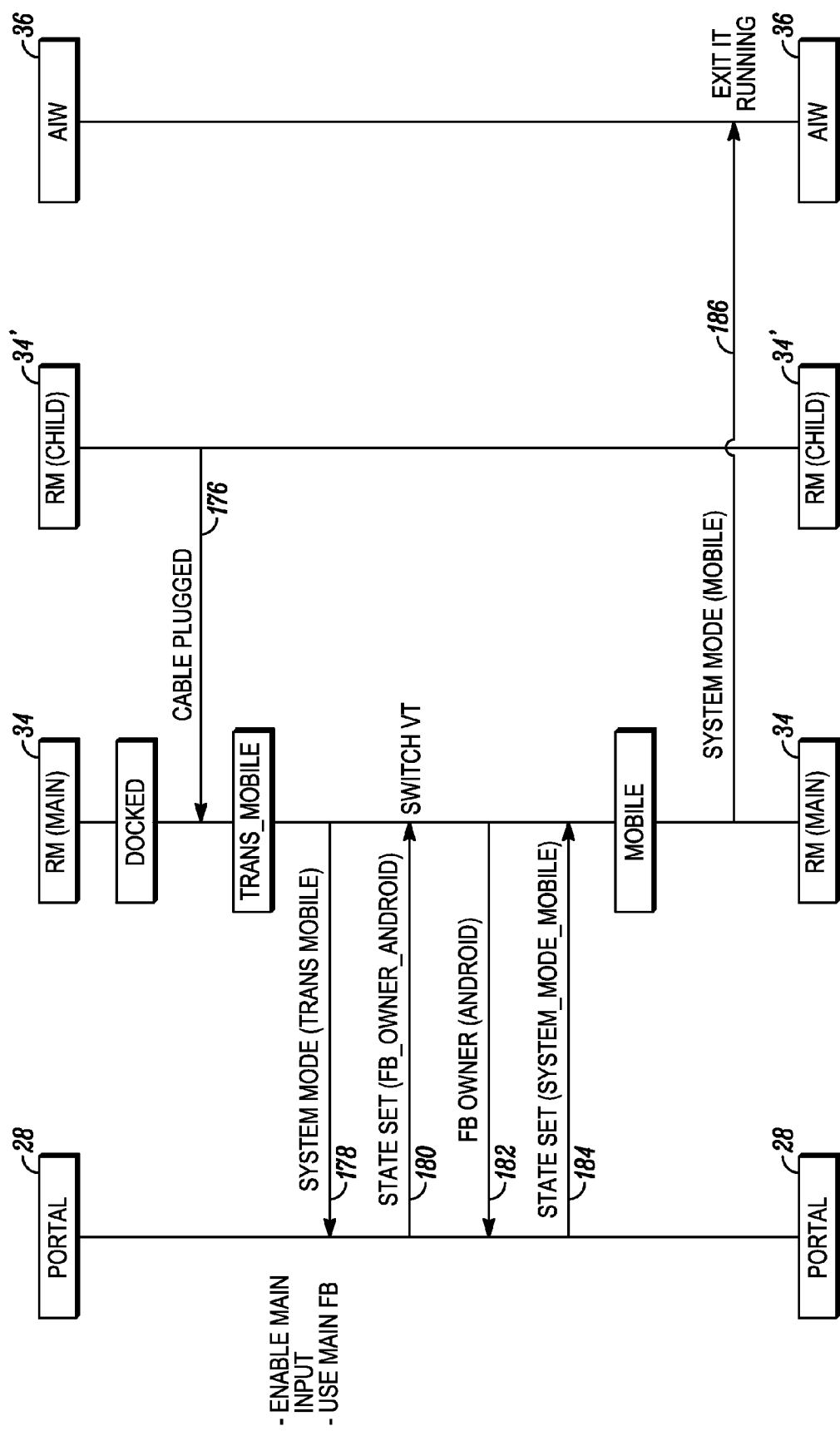

Referring to FIG. 11, an additional message sequence chart shows steps performed during an exemplary process in which the mobile device 10 transitions from the docked mode (where the primary environment is the second environment 24) to the mobile mode (where the primary environment is the first environment 22). As shown, a cable signal 176 is received by the resource manager 34, which indicates that an HDMI or alternate hardwire plug has been removed from the mobile device 10 (also as shown, the cable signal 176 can be considered as being received from a child resource manager 34', as opposed to the main resource manager 34). Removal of the plug indicates that a peripheral device (not shown) is no longer in communication with the mobile device 10. In an alternative embodiment, the plug can be representative of wireless communication between the mobile device 10 and a peripheral or alternate device (not shown), and enabling of such wireless communication would cause a mode state initialization change signal to be generated. Subsequent to the signal 176, a sequence of further signals transitioning the device from docked mode to mobile mode is initiated. In this regard, a signal 178 is sent from the resource manager 34 to the portal activity module 28 indicating a mode status transition and enabling the main data input and the main framebuffer. The portal activity module 28 then sends a signal 180 to the resource manager 34 identifying the first environment 22 as now being primary and switching the virtual terminal. Further, a signal 182 is sent from the resource manager 34 to the portal activity module 28 identifying the first environment 22 as the primary environment that has taken ownership of the framebuffer. Additionally, a mode state change confirmation signal 184 is sent from the portal activity module 28 to the resource manager 34 identifying that the mobile device 10 is now in the mobile mode and that the first environment 22 is the primary environment. A system mode update signal is sent from the resource manager 34 to the AIW 36.

Figure 12:
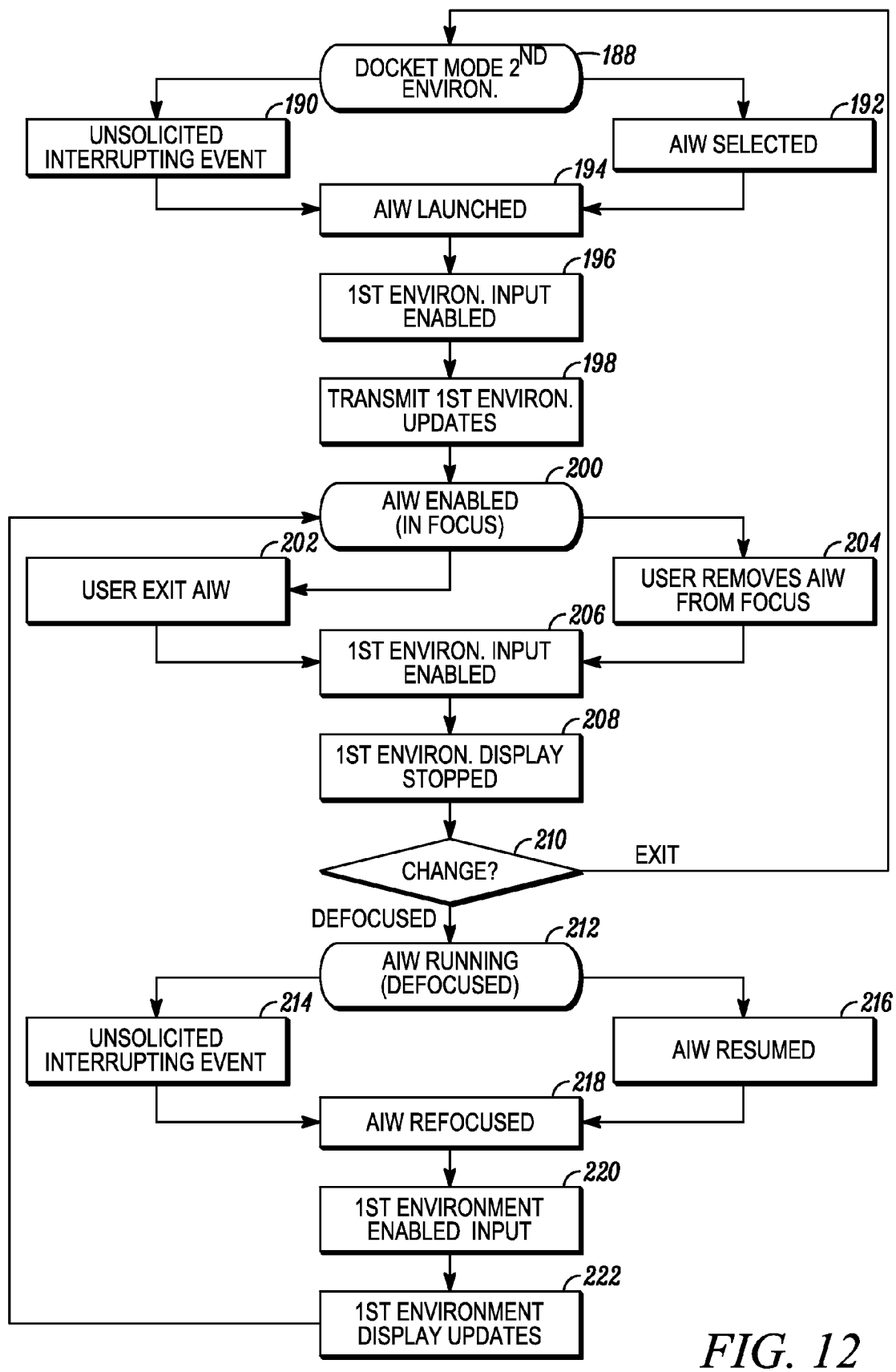
FIG. 12 is a flow chart showing steps of an exemplary process for using an application controlled by a first environment of the operating system of FIG. 2 while a second environment of that operating system has primary control.

Turning to FIG. 12, a further flow chart shows steps of an exemplary process for using an application controlled by a first environment of the operating system of FIG. 2 while a second environment of that operating system has primary control. As shown, the process begins at step 188 at which the mobile device 10 is idle in the docked mode such that the second environment 24 is the primary environment. Then, if an unsolicited event occurs at step 190 or the user selects the first environment 22 in a window application at step 192, then the first environment 22 in a window application is launched at step 194. By example, assuming that the first environment 22 is Android-based as discussed above, then the AIW module (or application) 36 is launched. The AIW module 36 enables a user to access the Android applications 32 (see FIG. 3) while the device is operating in the docked mode. The resource manager 34 is also notified of the status update at step 194. Subsequently, at step 196, input to the first environment 22 is enabled and further, at step 198, a transmission of first environment display update notifications occurs. The AIW module 36 thus is operating and has focus at step 200.

Figure 13:
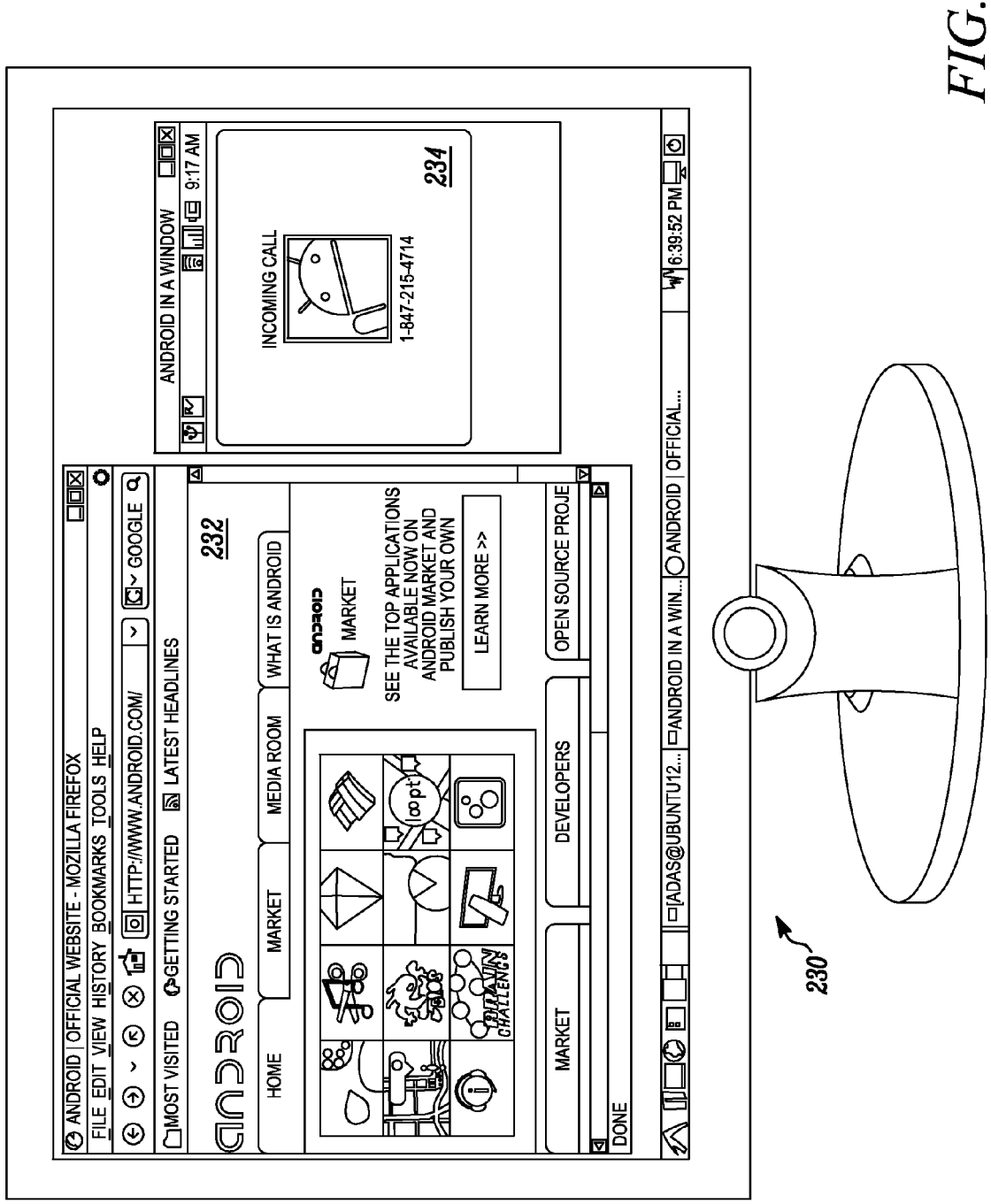
FIG. 13 shows an exemplary monitor with a display screen showing exemplary windows that can be displayed as a result of performing of the process of FIG. 12.

Referring additionally to FIG. 13, an exemplary computer monitor 230 is shown, on which are displayed exemplary windows that can appear due to the operation of the mobile device 12 in accordance with the steps 188-200 discussed above. For purposes of the present example, it can be assumed that the monitor 230 is an additional device with which the mobile device 12 is docked (in some cases, the monitor can be part of or associated with a computer such as a PC with which the mobile device 12 is docked). More particularly as shown, due to operation in the docked mode in accordance with the step 188, a primary window 232 generated by a corresponding application of the second environment 24 is displayed on the monitor 230. Notwithstanding the display of the primary window 232, the monitor 230 is also shown to display a secondary window 234, which is an AIW window. The secondary window 234 appears in response to the occurrence of an unsolicited event at the step 190, which in the present example is the detection by the mobile device 12 of an incoming phone call to the mobile device. Due to the unsolicited event, at the step 194 the AIW module 36 is launched and the additional steps 196-200 are performed such that, correspondingly, the secondary window is generated. At the step 200, the secondary window 234 is in focus, rather than the primary window, that is to say, the focus has changed from the primary window to the secondary window as a result of the performing of the steps 190 and 194-200.

Again particularly with respect to FIG. 12, upon reaching step 200, it is subsequently possible that the AIW module 36 will be exited or that a user will remove the AIW module from focus. If the AIW module 36 is exited at step 202 or a user removes AIW from focus at step 204, then in either case the first environment 22 input is disabled at step 206 and additionally the first environment 22 display is stopped at step 208. Subsequently, at step 210 it is again considered whether the AIW module 36 was exited at step 202 or a user removed the AIW from focus at step 204. If the AIW module 36 was exited at step 202, then following step 210 the mobile device 10 reverts to the idle docked mode by returning to step 188. Thus, with respect to the example shown in FIG. 13, the secondary window 234 disappears and the primary window 232 remains and regains focus. Alternatively, if the AIW module 36 was merely defocused, then the AIW module 36 continues to operate at step 212 in this defocused state. In this case, with respect to the example shown in FIG. 13, both the primary window 232 and the secondary window 234 remain displayed on the monitor but it is the primary window 232 which has focus.

While the AIW module 36 and correspondingly the secondary (AIW) window 234 is defocused, it is still possible for a user to select the AIW module and continue interaction with the AIW window, so as to refocus the AIW module (and notify the resource manager 34 of any status update), as well as possible for unsolicited interrupting events to occur that may precipitate a refocusing of the AIW module. Thus, as shown, once the AIW module 36 is operating in the defocused state, if either an unsolicited event occurs that interrupts the operation of the AIW module 36 at step 214 or a solicited interaction with the AIW module 36 occurs at step 216, then in either case the AIW module 36 subsequently regains focus at step 218. After the AIW module 36 regains focus, the first (Android) environment 22 input is enabled at step 220 and also the first environment display update notifications are transmitted to the resource manager 34 at step 222. After step 222, the mobile device 10 reverts to step 200, where the AIW module 36 is enabled and in focus. As mentioned above, when an application is in focus, that application is at the logical top of a stack of running applications.

Thus, in accordance with at least one embodiment, a mobile device operating system having a core kernel configured to interface a device hardware component and a middleware component is provided. The system includes at least two co-existing independent middleware operating environments coupled to the core kernel, the middleware operating environments each having a corresponding application component.

According to another embodiment, a mobile computing device having a memory storage unit coupled to a computer processor is provided. The memory storage unit includes computer executable instructions capable of operating at least two operating system environments on a common kernel According to yet another alternative embodiment, a mobile telephone having a graphical user interface configured to receive and transmit multimedia information is provided. The telephone includes a computing system with a processor coupled to a memory storage unit, and a multi-environment operating system having a common kernel. The memory storage unit includes computer executable instructions capable of managing resources shared between at least two co-existing independent operating system environments.

In accordance with an alternative embodiment, a mobile computing device with a computer processor coupled to a computer memory having computer executable instructions configured to initiate an operating system. The device also includes an operating system configured to simultaneously run a standard Linux distribution operating system environment and an Android™ operating system environment on a single kernel.

According to yet another alternative embodiment, a mobile device operating system having a core kernel configured to interface a device hardware component and a middleware component. The device also includes a first independent middleware operating environment configured to run JAVA-interpreted applications and coupled to the core kernel, and a second independent middleware operating environment configured to run native applications and coupled to the core kernel.

In accordance with at least one embodiment, a method for booting a device having at least two co-existing independent operating environments is provided. The method includes initiating a start-up boot sequence, initializing a core kernel, identifying a device mode state, launching services common to a first operating system and a second operating system, selecting a primary operating system based at least in part upon the mode state and launching initializing scripts of the primary operating system; and launching initializing scripts of a secondary operating system.

In an alternative embodiment, a method for operating a device having multiple co-existing operating environments is provided. The method includes initiating a boot sequence configured to simultaneously launch two operating system environments, identifying the mode state of the device and selecting a primary operating environment based at least in part upon the mode state.

In yet another embodiment, a mobile device operating system having a core kernel configured to interface a device hardware component and a middleware component is provided. The system includes at least two co-existing independent middleware operating environments coupled to the core kernel, the middleware operating environments each having a corresponding application component.

According to another embodiment, a mobile computing device having a memory storage unit coupled to a computer processor is provided. The memory storage unit includes computer executable instructions capable of operating at least two operating system environments on a common kernel According to yet another alternative embodiment, a mobile telephone having a graphical user interface configured to receive and transmit multimedia information is provided. The telephone includes a computing system with a processor coupled to a memory storage unit, and a multi-environment operating system having a common kernel. The memory storage unit includes computer executable instructions capable of managing resources shared between at least two co-existing independent operating system environments.

In accordance with an alternative embodiment, a mobile computing device with a computer processor coupled to a computer memory having computer executable instructions configured to initiate an operating system. The device also includes an operating system configured to simultaneously run a standard Linux distribution operating system environment and an Android™ operating system environment on a single kernel.

According to yet another alternative embodiment, a mobile device operating system having a core kernel configured to interface a device hardware component and a middleware component. The device also includes a first independent middleware operating environment configured to run JAVA-interpreted applications and coupled to the core kernel, and a second independent middleware operating environment configured to run native applications and coupled to the core kernel.

From the above description, it should be evident that the capabilities and operational characteristics of different environments such as the first and second environments 22, 24 can be particularly tailored for the applications and functions those environments are intended to serve. In the present embodiment, in this regard, the first (Android) environment 22 has special characteristics that are particularly suited for mobile device functionality while the second (Linux-based) environment 24 does not have such characteristics tailored in this manner to such an extent. For example, given some of the limitations associated with mobile device displays in comparison with other types of displays (e.g., desktop computer displays), and given that the first environment 22 in the present embodiment is particularly tailored for facilitating mobile device operation while the second environment 24 is not tailored for such purposes to such an extent, in the present embodiment the second environment (and particularly the middleware 7 of that environment) supports either a greater number of display resolutions or higher-level display resolutions than the first environment (and its middleware 3).

Additionally, given the limited CPU power available in many mobile devices, achieving sufficiently high processing speeds is often of concern in the design and implementation of the mobile devices. Use of the Android environment as the first environment 22 as discussed above is appropriate for such mobile devices given such concerns and the operational circumstances often faced by mobile devices. In particular, because the Android environment generally includes a custom library in which the C library has to be loaded in each process, the custom library is desirably small: The bionic library in particular is a smaller library than, and has more limited functionality than, the glibc library. Also, use of the bionic library allows for greater speed of operation of a mobile device due to the library's small size and fast code paths. Further, the bionic library also has built-in support for important Android-specific services such as system properties and logging, although it should be further noted that the bionic library does not support certain POSIX features, such as C++ exceptions and wide characters (thus it is not quite compatible with the glibc library, which is substantially POSIX compliant). In view of the above, the Android environment 22 utilizes the bionic library rather than the glibc library, and all native code is compiled against bionic and not glibc.

In addition, embodiments of the present invention are capable of operating in a manner in which pre-run-time compiled applications are enabled in one environment such as the second (Linux-based) environment 24, while other register-based applications are interpreted at run-time so as to be enabled in another environment, such as the first (Android) environment 22. The pre-run-time compiled applications can among other things include, for example, C/C++ native applications that are compiled before run-time. Given such embodiments, it is possible to have both pre-run-time compiled applications and register-based run-time interpreted applications interact with a common physical environment simultaneously, by virtue of being coupled through the common Linux kernel 18. Alternatively stated, such operation enables GNU to operate pre-run-time compiled applications (like OpenOffice, or Mozilla Firefox) concurrently with Android running run-time interpreted Dalvik-intentioned applications.

Notwithstanding the above, the present invention is intended to encompass numerous other embodiments, including numerous variations of the embodiments discussed above. Thus, in a number of embodiments, it is envisioned that the mobile device 10 transitions between mode states (and consequently between environments) in response to an unsolicited event such as the docking or undocking of the mobile device 10. Yet, also in some embodiments it is contemplated that the mobile device 10 can transition between mode states (and between environments) based upon events other than docking or undocking the mobile device 10, and/or based upon events other than unsolicited events. By example, if the mobile device 10 is stationary for a preset period of time, the mobile device 10 can be programmed to operate in the most energy efficient mode state, regardless of the device status otherwise. In yet another example, a user can transition the mode state from docked to mobile even if the device has a connection with a peripheral device. Additionally, the type of peripheral device connected to the mobile device 10 can dictate whether an automatic mode state change sequence is initiated or a user has provided a mode state change request. In some cases, a user is able to select the mode state in which to operate the mobile device 10.

Further, in some embodiments, it is possible for the mobile device 10 to switch from one of the mode states (environments) to the other of the mode states (environments) when a user invokes an application associated with the other mode state. Indeed, depending upon the embodiment, the mobile device 10 can be configured so that any event or events can trigger a change in mode state (environment). For example, in an embodiment where the mobile device 10 is in communication with a web server or intermediate server, a push from that web server or intermediate server (e.g., a forced sending of information from that server to the mobile device) can automatically precipitate a switching from one environment (e.g., the environment 24) to another environment (e.g., the environment 22) suitable for receiving the pushed information. Notwithstanding the above description, depending upon the embodiment, the switching from one mode (environment) to another can be viewed as a process of pre-emption. For example, when an unsolicited event occurs that triggers a switch between the environment 22 and the environment 24, it can be said that the environment 22 is pre-empted by the unsolicited event such that the environment 24 is then initiated. Further, the present invention is intended to encompass numerous further embodiments in which a variety of additional mode states (environments) are contemplated, including a variety of mode states (environments) that depend upon the particular mobile device 10 usage and the applications available in the memory of the device hardware 20.

It is specifically intended that the present invention not be limited to the embodiments and illustrations contained herein, but include modified forms of those embodiments including portions of the embodiments and combinations of elements of different embodiments as come within the scope of the following claims.

The invention claimed is:

1. A method for booting a device having at least two simultaneous co-existing independent operating environments, comprising the following steps:
    initiating a start-up boot sequence;
    initializing a core kernel;
    identifying that the device is docked;
    launching services common to a first operating system and a second operating system that both operate on the core kernel, wherein the services are other than kernel-level services;
    selecting a personal computing primary operating system based at least in part upon the identifying that the device is docked, wherein the first operating system is the personal computing primary operating system;
    launching initializing scripts of the personal computing primary operating system; and
    launching initializing scripts of a secondary mobile operating system, wherein the second operating system is the secondary mobile operating system, and wherein the second operating system operates while the first operating system is operating as the personal computing primary operating system.

2. The method according to claim 1, wherein the device boots the personal computing primary operating system first when the device is identified as docked.

3. The method according to claim 1, wherein the device boots the mobile operating system first when the device is booted while the device is not identified as docked.

4. The method of claim 1, wherein the first and second operating systems do not exist in a virtualization or emulation scheme but rather operate on the core kernel.

5. A method for initializing an operating system, comprising the following steps:
    initializing a boot sequence;
    selecting at least two independent, simultaneous operating system environments for operating a mobile device, the at least two operating system environments being configured to be independent and co-exist while the device is operational;
    launching a common kernel on which each of the at least two operating system environments operate;
    launching application services common to a first of the at least two operating system environments and a second of the at least two operating system environments, wherein the services are other than kernel-level services;
    based at least in part upon a mode state of the device, selecting one of the first operating system environment and the second operating system environment as the primary operating system environment and the other of the first operating system environment and the second operating system environment as the secondary operating system environment; and
    launching initializing scripts for the primary and secondary operating system environments;
    wherein the second operating system environment is the primary operating system environment when the mode state is a docked mode, and wherein the first operating system environment operates while the second operating system environment is operating as the primary operating system environment.

6. The method according to claim 5, further comprising the step of initiating a secondary operating system application.

7. The method according to claim 5, wherein the first operating system environment is mobile operating system environment.

8. The method of claim 5, wherein the services are launched simultaneously.

9. The method of claim 5, wherein the first and second operating systems do not exist in a virtualization or emulation scheme but rather operate on the common kernel.

10. The method of claim 5, wherein whether the launching of the initializing scripts of the personal computing primary operating system occurs subsequent to or prior to the launching of the initializing scripts of the secondary mobile operating system depends upon the mode state.

11. A method for operating a device comprising the following steps:
    initiating a boot sequence, configured to launch two co-existing operating system environments that do not exist in a virtualization or emulation scheme but rather operate on a shared, single kernel;
    identifying the mode state of the device;
    selecting a first of the two co-existing operating system environments as a primary operating system environment based at least in part upon the mode state; and
    changing the primary operating environment to a second of the two co-existing operating system environments based at least in part upon a change in the mode state of the device, wherein the first of the operating system environments still continues to operate while the second operating system environment is operating as the primary operating environment;
    wherein the mode state changes from a mobile mode to a docked mode when the device is docked.

12. The method according to claim 11, wherein the mode state changes from a docked mode to a mobile mode when the device is removed from a docking station.

13. The method according to claim 12, wherein the primary environment switches from the mobile mode to a desktop mode when the device is docked.

14. The method of claim 11 further comprising launching services Common to the two co-existing operating system environments.

15. A method for operating a device having a kernel, a first environment with first middleware, and a second environment with second middleware, wherein each of the environments interfaces the kernel:
    initializing the kernel;
    identifying a device mode state;
    launching services common to each of the first environment and the second environment;
    determining one of the first and second environments as being a primary environment based at least in part upon the mode state; and
    launching initializing scripts for each of the first and second environments,
    wherein the first middleware of the first environment is configured to interpret application code at run-time with a byte-code interpreter, and the second middleware of the second environment is configured to execute a pre-run-time-compiled application;
    and further including determining that an event has occurred; and
    in response to the event, switching from the one of the environments being the primary environment to the other of the environments being the primary environment
    wherein the event that is determined to have occurred is a docking of the device in relation to another device, and wherein the switching from the one environment to the other environment involves a switching between a first focus pertaining to the pre-run-time compiled application and a second focus pertaining to another application based upon the interpreted application code.

16. The method of claim 15, wherein the services are other than kernel-level services.

17. A method for operating a mobile device comprising:
    providing at least two operating system environments for operating the mobile device, the at least two operating system environments being configured to be independent and co-exist while the device is operational;
    providing a common kernel on which each of the at least two operating system environments operate; and
    launching application services common to a first of the at least two operating system environments and a second of the at least two operating system environments, wherein the services are other than kernel-level services.

18. The method of claim 17, wherein the at least two operating system environments do not exist in a virtualization or emulation scheme but rather operate on the common kernel.

19. The method of claim 17, further comprising:
    based at least in part upon a mode of the device, selecting a first of the at least two operating system environments as a primary operating system environment and a second of the at least two operating system environments as a second operating system environment.

* * * * *